United States Patent
Khorshidian et al.

(10) Patent No.: US 11,649,837 B2
(45) Date of Patent: May 16, 2023

(54) CHOKE CONTROLLER, SYSTEM, AND METHOD USING ADAPTIVE PROPORTIONAL GAIN TO CONTROL CHOKE BASED ON PRESSURE SETPOINT

(71) Applicant: Opla Energy Ltd., Calgary (CA)

(72) Inventors: Hossein Khorshidian, Calgary (CA); Skyler Lowe, Calgary (CA); Saied Afshari, Calgary (CA)

(73) Assignee: Opla Energy Ltd., Calgary (CA)

( * ) Notice: Subject to any disclaimer, the term of this patent is extended or adjusted under 35 U.S.C. 154(b) by 42 days.

(21) Appl. No.: 17/345,559

(22) Filed: Jun. 11, 2021

(65) Prior Publication Data
US 2022/0018365 A1   Jan. 20, 2022

Related U.S. Application Data

(60) Provisional application No. 63/038,605, filed on Jun. 12, 2020.

(30) Foreign Application Priority Data

Jun. 10, 2021   (CA) ..................... 3121774

(51) Int. Cl.
*F15B 5/00*   (2006.01)
*G05B 11/32*   (2006.01)
(Continued)

(52) U.S. Cl.
CPC .............. *F15B 5/006* (2013.01); *F16K 31/04* (2013.01); *G05B 11/32* (2013.01); *G05B 11/42* (2013.01);
(Continued)

(58) Field of Classification Search
CPC .......... F15B 5/006; F15B 21/00; F16K 31/04; F16K 17/003; G05B 11/32; G05B 11/42; G05B 2219/41301
See application file for complete search history.

(56) References Cited

U.S. PATENT DOCUMENTS 9,995,098 B2 *   6/2018   Brana ................. G05B 19/042
2013/0068452 A1 *   3/2013   Wingate ................. E21B 43/12
166/250.15

(Continued)

FOREIGN PATENT DOCUMENTS

JP   2001142536   *   5/2001
WO   WO-2016180968 A1   *   11/2016

*Primary Examiner* — Kenneth M Lo
*Assistant Examiner* — Jonathan Michael Skrzycki
(74) *Attorney, Agent, or Firm* — Christopher N. Hunter; Laurie Wright; Blake, Cassels & Graydon LLP

(57) ABSTRACT

A controller and related system and method for controlling a choke for choking fluid flow are configured to take into account non-linear behaviors of the choke, to allow more accurate and effective control of the choke. To obtain a desired pressure drop across a choke valve, the controller is configured to monitor the position of a choke actuator coupled to the choke valve and the pressure at the inlet of the choke valve. The controller calculates an adaptive proportional gain coefficient, and optionally adaptive integral and derivative coefficients, based on the choke actuator position, to help mitigate the effects of non-linear behaviors of the choke and, where necessary, based on the inlet pressure, the controller calculates an augmentation correction to address any instability in the choke. The controller then commands the choke actuator accordingly to adjust the flow area through the choke valve.

27 Claims, 12 Drawing Sheets

(51) Int. Cl.
  *G05B 11/42* (2006.01)
  *F16K 31/04* (2006.01)
  *F15B 21/00* (2006.01)
  *F16K 17/00* (2006.01)

(52) U.S. Cl.
  CPC ............ *F15B 21/00* (2013.01); *F16K 17/003* (2013.01); *G05B 2219/41301* (2013.01)

(56) References Cited

U.S. PATENT DOCUMENTS

2016/0298401 A1* 10/2016 Cotten .................... G05B 19/05
2018/0283137 A1* 10/2018 Peyregne ................ E21B 34/02
2021/0230966 A1*  7/2021 Dietrich ................ F16K 5/0207

* cited by examiner

CHOKE CONTROLLER, SYSTEM, AND METHOD USING ADAPTIVE PROPORTIONAL GAIN TO CONTROL CHOKE BASED ON PRESSURE SETPOINT

CROSS-REFERENCE TO RELATED APPLICATIONS

This application claims the benefit of U.S. Provisional Application No. 63/038,605, filed Jun. 12, 2020 and Canadian Application entitled "Choke Controller, System and Method" filed Jun. 10, 2021, the contents of which are both hereby incorporated by reference in their entireties.

FIELD

The invention relates to a control system and method for use in industrial applications, and more particularly to a choke controller and related system and method that are configured to account for non-linear behaviors of chokes while controlling the chokes in various industrial applications, including oil and gas operations, where fluid pressure management is desired.

BACKGROUND

Fluid pressure management systems are used in various industrial applications, including oil and gas operations, to control fluid pressure. For example, a wellbore drilling operation is conducted on an onshore or offshore drill rig located proximate the wellbore location. For some drilling operations, a fluid pressure management system, such as a choke manifold, is used to control fluid pressure for the drilling operation and such a system comprises specialized valves or similar mechanical devices, used to seal, control, and monitor fluid and/or gas in the wellbore. The typical choke manifold can include one or more chokes for "choking" fluid flow (i.e., obtaining a desired pressure drop), and may include other components such as electrical and hydraulic lines, control pods, kill and choke lines and valves, flowmeters, rams, valves, seals, riser joints, hydraulic connectors, and a support frame. The chokes are controlled by a choke controller to maintain a particular fluid flow rate and fluid pressure through each respective choke. The chokes can be individually and selectively controlled until the pressure at the inlet of the choke is at a desired level.

In some situations, the choke can behave non-linearly, for example before, during, and/or after connection of new drill string segments, which conventional choke controllers cannot effectively account for. Existing technologies that attempt to address this issue typically require additional equipment and/or human operators to operate. For example, a known system requires an auxiliary pump and multiple pump operators; another system requires a circulation sub and at least one operator; yet another system requires nitrogen packages and multiple operators; and another system requires a pump diverter and at least one operator.

The present disclosure aims to provide a controller and related system and method that take into account the non-linear behavior of the choke to allow more effective and accurate control over the fluid flow and fluid pressure through the choke, without extra equipment and/or intervention of human operators.

SUMMARY

According to a broad aspect of the present disclosure, there is provided a controller for controlling a choke actuator, the controller comprising: a processor; a memory device having instructions that, when executed by the processor, cause the controller to: receive, in real-time, position data for the choke actuator configured to control a choke valve that is positioned between an inlet and an outlet, the position data corresponding to a first position of the choke actuator; receive, in real-time, pressure data associated with a fluid pressure at the inlet; determine an adaptive proportional gain coefficient based on the position data; determine an error based on the pressure data and a predetermined setpoint pressure; determine a control variable based, at least in part, on the adaptive proportional gain coefficient and the error, the control variable corresponding to a movement of the choke actuator from the first position to a second position; generate a command signal based on the control variable; and send the command signal to the choke actuator to cause the choke actuator to move as specified by the command signal.

In some embodiments, the instructions further cause the controller to: determine, prior to generating the command signal, whether the choke valve is in an unstable state based on the pressure data; determine an augmentation correction where the error is greater than a predetermined augmentation threshold and the choke is in the unstable state; and correct the control variable with the augmentation correction.

In some embodiments, the instructions further cause the controller to: determine, prior to generating the command signal, whether the second position is in between a fully open position and a fully closed position of the choke actuator; and correct the control variable if the second position is not between the fully open position and the fully closed position.

In some embodiments, determine the control variable comprises determining the control variable at a time t (u(t)) according to:

$$u(t) = Pe(t) + I\int_0^t e(\tau)d\tau + D\frac{de(t)}{dt}$$

where P is the adaptive proportional gain coefficient, e(t) is the error at time t, I is an integral coefficient, and D is an derivative coefficient.

In some embodiments, the adaptive proportional gain coefficient is:

$$P = A[x(t)+C1]^B + C2$$

where x(t) is a relative choke position of the choke valve derived from the position data received at time t, and A, B, C1, and C2 are constants.

In some embodiments, the instructions further cause the controller to: receive data regarding operational conditions; and determine one or more of A, B, C1, and C2 based, at least in part, on the data regarding operational conditions.

In some embodiments, the integral coefficient is an adaptive integral coefficient, and the adaptive integral coefficient is:

$$I = E \times P/T$$

where T is an oscillation period defined by Ziegler-Nichols and E is an experimentally determined constant.

In some embodiments, the derivative coefficient is an adaptive derivative coefficient, and the adaptive derivative coefficient is:

$$D = F \times T \times P$$

where T is an oscillation period defined by Ziegler-Nichols and F is an experimentally determined constant.

In some embodiments, the augmentation correction at a time t (AUG(t)) is:

$$AUG(t) = Y[(1-x(t))+C3]^U + W \times |e(t)|$$

where x(t) is a relative choke position derived from the position data received at time t, e(t) is the error at time t, and Y, C3, U, and W are experimentally determined constants.

In some embodiments, to determine whether the choke valve is in the unstable state, the instructions cause the controller to: determine a first time-derivative of pressure and a second time-derivative of pressure based on the pressure data; and determine that the choke valve is in the unstable state if the first time-derivative of pressure and the second time-derivative pressure are both negative or both positive.

In some embodiments, to correct the control variable with the augmentation correction, the instructions cause the controller to: correct the control variable in a backward direction if the first time-derivative of pressure and the second time-derivative of pressure are both positive; or correct the control variable in a forward direction if the first time-derivative of pressure and the second time-derivative of pressure are both negative.

In some embodiments, the instructions further cause the controller to: determine, prior to generating the command signal, whether the movement of the choke actuator from the first position to the second position is less than a predetermined maximum actuator movement; and correct the control variable if the movement of the choke actuator from the first position to the second position is not less than the predetermined maximum actuator movement.

In some embodiments, the controller comprises one or more of: a remote workstation; an onsite desktop workstation; and an onsite portable workstation, for receiving operator input.

In some embodiments, one or more of the remote workstations, the onsite desktop workstation and the onsite portable workstation comprises a human-machine interface having a display showing choke information and one or more choke controls that are adjustable by an operator.

In some embodiments, the controller is configured to operate autonomously.

According to another broad aspect of the present disclosure, there is provided a computer-implemented method for controlling a choke actuator, the method comprising: monitoring a first position of the choke actuator operable to variably control a choke valve that is positioned between an inlet and an outlet; monitoring a fluid pressure at the inlet; determining adaptive proportional gain coefficient based on the first position; determining an error by comparing the fluid pressure with a predetermined setpoint pressure; determining a control variable based, at least in part, on the adaptive proportional gain coefficient and the error, the control variable corresponding to a movement of the choke actuator from the first position to a second position; generating a command signal based on the control variable; and sending the command signal to the choke actuator to cause the choke actuator to move as specified by the command signal.

In some embodiments, the method comprises determining, prior to generating the command signal, whether the choke valve is in an unstable state based on the fluid pressure; determining an augmentation correction where the error is greater than a predetermined augmentation threshold and the choke is in the unstable state; and correcting the control variable with the augmentation correction.

In some embodiments, the method comprises determining, prior to generating the command signal, whether a second position is in between a fully open position and a fully closed position of the choke actuator; and correcting the control variable if the second position is not between the fully open position and the fully closed position.

In some embodiments, determining the control variable comprises determining the control variable at a time t (u(t)) according to:

$$u(t) = Pe(t) + I \int_0^t e(\tau)d\tau + D\frac{de(t)}{dt}$$

where P is the adaptive proportional gain coefficient, e(t) is the error at time t, I is an integral coefficient, and D is an derivative coefficient.

In some embodiments, the adaptive proportional gain coefficient is:

$$P = A[x(t)+C1]^B + C2$$

where x(t) is a relative choke position of the choke valve derived from the first position at time t, and A, B, C1, and C2 are constants.

In some embodiments, the method comprises monitoring sensor data regarding operational conditions and determining one or more of A, B, C1, and C2 based, at least in part, on the sensor data regarding operational conditions.

In some embodiments, the integral coefficient is an adaptive integral coefficient, and the adaptive integral coefficient is:

$$I = E \times P/T$$

where T is an oscillation period defined by Ziegler-Nichols and E is an experimentally determined constant.

In some embodiments, the derivative coefficient is an adaptive derivative coefficient, and the adaptive derivative coefficient is:

$$D = F \times T \times P$$

where T is an oscillation period defined by Ziegler-Nichols and F is an experimentally determined constant.

In some embodiments, the augmentation correction at a time t (AUG(t)) is:

$$AUG(t) = Y[(1-x(t))+C3]^U + W \times |e(t)|$$

where x(t) is a relative choke position derived from the first position at time t, e(t) is the error at time t, and Y, C3, U, and W are experimentally determined constants.

In some embodiments, determining whether the choke valve is in the unstable state comprises: determining a first time-derivative of the fluid pressure and a second time-derivative of the fluid pressure; and determining that the choke valve is in the unstable state if the first time-derivative and the second time-derivative are both negative or both positive.

In some embodiments, correcting the control variable with the augmentation correction comprises: correcting the control variable in a backward direction if the first time-derivative and the second time-derivative are both positive; or correcting the control variable in a forward direction if the first time-derivative and the second time-derivative are both negative.

In some embodiments, the method comprises determining, prior to generating the command signal, whether the movement of the choke actuator from the first position to the second position is less than a predetermined maximum actuator movement; and correcting the control variable if the movement of the choke actuator from the first position to the second position is not less than the predetermined maximum actuator movement.

In some embodiments, the method comprises displaying, via a human-machine interface, the first position of the choke actuator.

In some embodiments, the method comprises receiving operator input for one or more operating parameters from one or more of: a remote workstation; an onsite desktop workstation; and an onsite portable workstation.

In some embodiments, the method is performed periodically.

In some embodiments, the method is performed autonomously by a controller.

BRIEF DESCRIPTION OF THE DRAWINGS

The invention will now be described by way of an exemplary embodiment with reference to the accompanying simplified, diagrammatic, not-to-scale drawings. Any dimensions provided in the drawings are provided only for illustrative purposes, and do not limit the invention as defined by the claims. In the drawings:

DETAILED DESCRIPTION OF THE INVENTION

When describing the present invention, all terms not defined herein have their common art-recognized meanings. To the extent that the following description is of a specific embodiment or a particular use of the invention, it is intended to be illustrative only, and not limiting of the claimed invention. The following description is intended to cover all alternatives, modifications and equivalents that are included in the spirit and scope of the invention, as defined in the appended claims.

Figure 1A:
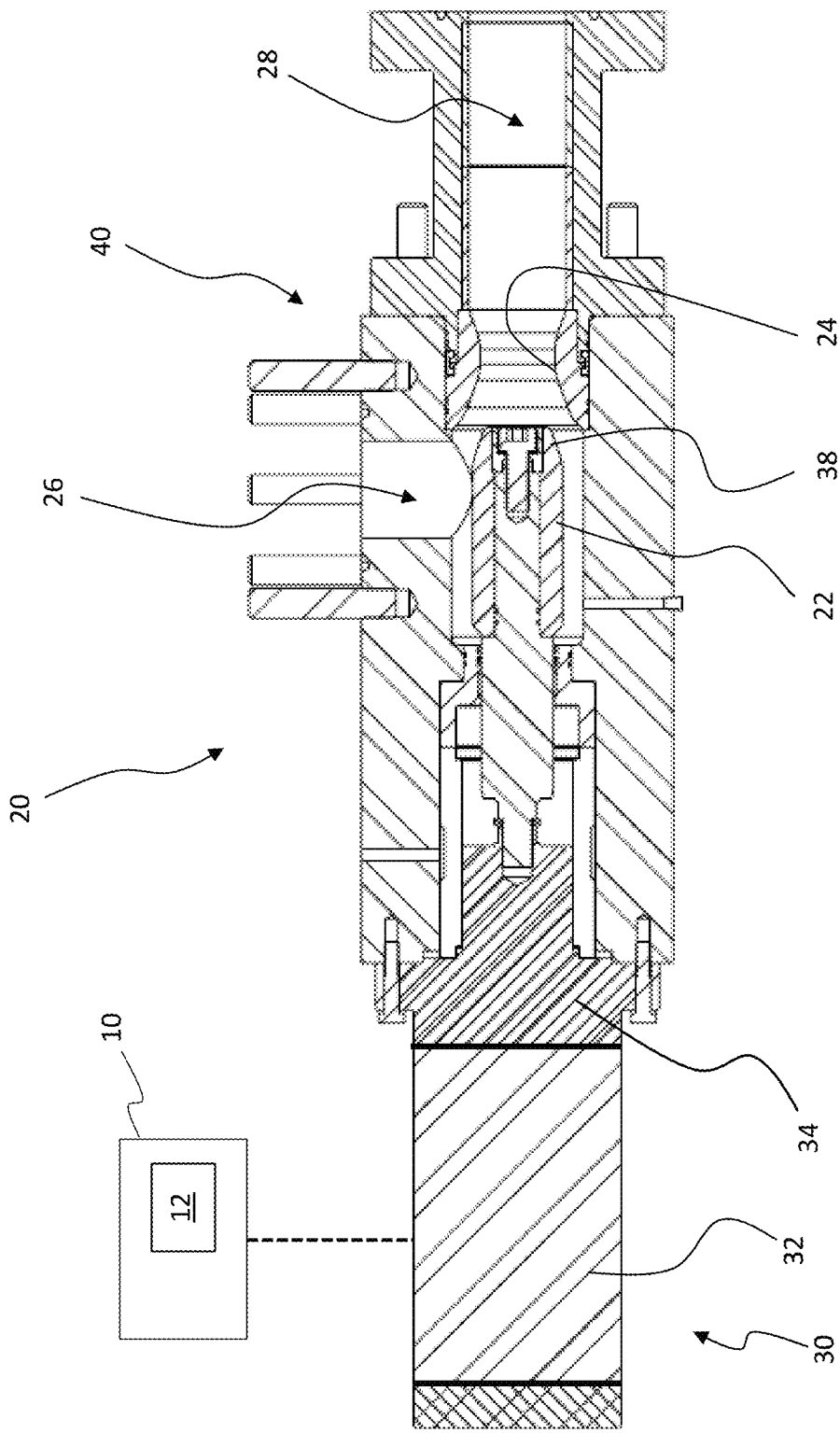
FIG. 1A is an axial cross-sectional view of a prior art choke, shown with a schematic view of a prior art choke controller.

In a conventional choke manifold, a fully automated choke is typically used as the primary component for controlling fluid pressure, for example the surface back pressure (SBP) at the top of the wellhead. FIG. 1A illustrates a choke 20 according to one embodiment. The choke 20 has a choke valve 40, which generally comprises a gate 22 and a choke seat 24, situated between a choke inlet 26 and a choke outlet 28 of the choke. The gate 22 is usually a rod having a frustoconical-shaped tip 38. The opening and closing of the choke valve are controlled by a choke actuator 30. In the illustrated embodiment, the choke actuator 30 comprises an electric motor 32 and mechanical drive system 34, which may comprise a gearbox, a screw jack, or a combination thereof. In alternative or additional embodiments, the choke actuator 30 may comprise servo-pneumatic or servo-hydraulic systems. By moving the gate 22 towards or away from the seat 24, the choke actuator 30 is used to adjust the extent to which the choke valve 40 is open to flow between the inlet 26 and outlet 28, thereby controlling the amount of fluid flow through the choke 20 for the purpose of maintaining a desired flow rate and pressure through the choke.

The choke actuator 30 is controlled by a choke controller 10, which may comprise a proportional-integral-derivative (PID) controller 12. PID is a control loop mechanism for controlling a dynamic system by employing the system's feedback. The PID controller can periodically determine three different control coefficients, namely proportional, integral, and derivative (the "PID coefficients"). The weighted summation of the PID coefficients is a control variable (u):

$$u(t) = Pe(t) + I \int_0^t e(\tau)d\tau + D\frac{de(t)}{dt} \qquad (1)$$

where P is the proportional gain coefficient, I is the integral coefficient, and D is the derivative coefficient. The error e is defined as:

$$e(t) = SP(t) - PV(t) \qquad (2)$$

where SP is the setpoint value of the desired variable (e.g. the desired SBP in drilling operations or the wellhead pressure in well control operations) and PV is the measured process variable at a given time t, which is usually the time at which the PID is calculating the control variable u. For example, PV(t) is the measured SBP at the t in some embodiments.

The PID controller 12 is configured to calculate e(t) and u(t) at set time intervals ("time steps") in a substantially continuously loop. At each time step, the PID controller 12 calculates the error e(t) and tries to minimize the error by adjusting the control variable u(t). The control variable can be correlated to an action in the system. In the case of a choke, the value of u(t) may correspond to the amount of movement of the choke actuator 30 which in turn corresponds to the axial movement of the gate 22 with respect to the choke seat 24 inside the choke 20. The calculated control variable u(t) can then be translated into a command that is sent to the choke actuator 30 for execution, to cause the desired amount of movement of the choke actuator 30 and in turn the gate 22. The values of the control coefficients P, I, and D in Equation (1) are determined for each system by experimentation and testing.

The proportional gain coefficient P, the integral coefficient I, and the derivative coefficient D are constants for systems that exhibit linear characteristics. The conventional PID controller assumes that the choke 20 behaves linearly regardless of the position of the gate 22, so the rate of change in the control variable u in relation to the error e is constant, i.e., the displacement of gate 22 inside the choke 20 towards or away from the choke seat 24 is a function of the error e, even in extreme choke positions where the choke valve 40 is nearly fully open (NFO) and where the choke valve 40 is nearly fully closed (NFC).

In reality, in some situations, the choke 20 behaves non-linearly so the rate of change in the control variable u with respect to the error e is not necessarily constant as the gate 22 moves relative to the choke seat 24, and the conventional PID controller 12 cannot effectively account for such non-linear behavior in the choke 20. A sample situation where the choke 20 exhibits non-linearity is when the choke valve 40 is in the NFC position. In the NFC position, the area available for fluid to flow inside the choke decreases with time as the gate 22 gets closer to the choke seat 24. Although the gate 22 moves at a substantially constant velocity toward the seat 24 (as implied by the constant proportional gain coefficient P in the PID controller 12), the flow area decreases faster (i.e., non-linearly) because the tip 38 is frustoconical-shaped. At the NFC position, the fluid pressure at the choke inlet 26 increases drastically due to the rapidly decreasing flow area. This drastic increase in fluid pressure can cause, for example, an overshoot of the SBP beyond the desired SBP, which may result in high pressure hazards during drilling operations. For example, a conventional PID controller 12 may avoid this overshoot by lowering the proportional gain coefficient P. However, with a small proportional gain coefficient, the gate moves very slowly over the entire range of the gate's stroke, thereby causing a delayed response to any changes in the system, such as variations in flow rate or plugged trim.

The present disclosure aims to address the non-linear behavior of the choke to allow more accurate and effective control of the choke. The present disclosure is directed to a controller and related system and method for controlling a choke for various industrial applications where fluid pressure management is desired, including oil and gas operations, such as managed pressure drilling, well control, oil and gas production, and refinery operations. In some embodiments, to obtain a desired pressure drop across a choke valve, the controller is configured to monitor the position of a choke actuator coupled to the choke valve and the pressure at the fluid inlet of the choke valve, and to adjust the position of the choke valve, as necessary. Based on the position of the choke actuator and the inlet pressure, the controller determines how to adjust the choke position by calculating an adaptive proportional gain coefficient to help mitigate the effects of non-linear behavior of the choke, and, where necessary, an augmentation correction to address any instability in the choke, and the controller commands the actuation of the choke actuator accordingly. The augmentation correction allows the choke to quickly respond to sudden changes of fluid flow and/or clogging of the flow area in the choke valve. The present technology aims to provide an efficient and accurate way to autonomously control the inlet pressure of the choke by monitoring the choke position and inlet pressure in real time and adjusting the flow area through the choke valve as needed. In some embodiments, the controller and related system and method of the present disclosure can be configured to operate autonomously, i.e., without extra equipment and/or human intervention.

Figure 1B:
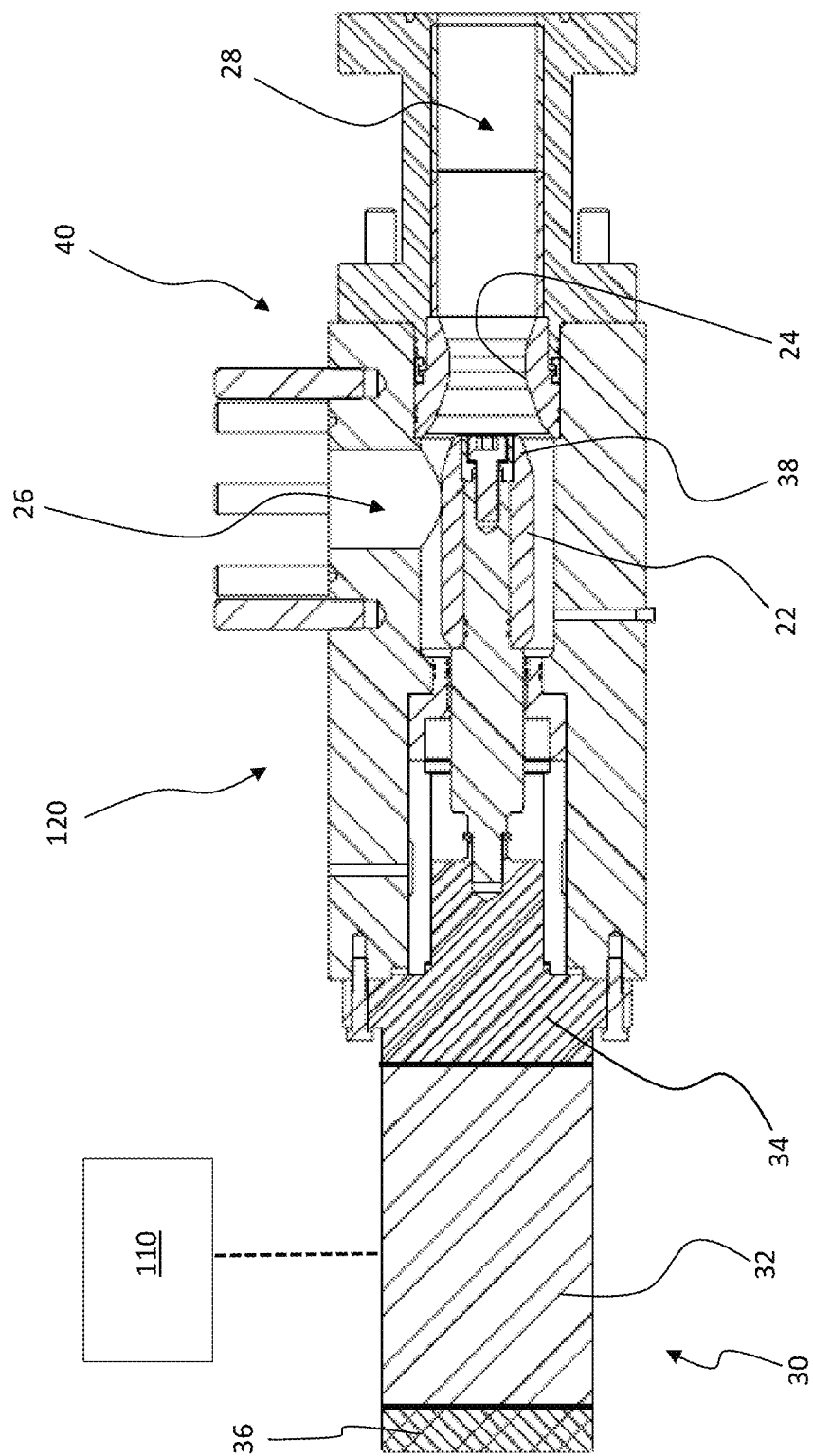
FIG. 1B is an axial cross-sectional view of a choke, shown with a schematic view of a choke controller, of a choke system of the present disclosure, according to one embodiment.

To further describe the present technology, examples are now provided with reference to the figures. With reference to FIG. 1B, a choke 120 is the same as or similar to choke 20 described above and like components of choke 120 are denoted by the same reference numbers as those in FIG. 1A with respect to choke 20. The choke actuator 30 of choke 120 operates to move the gate 22 axially relative to the choke seat 24. In some embodiments, rotational movement of the choke actuator 30 translates to axial movement of the gate 22. In some embodiments, the choke actuator 30 may rotate the gate 22 in addition to moving the gate axially. In some embodiments, the choke actuator 30 is controlled and actuated by a choke controller 110.

In some embodiments, the choke 120 comprises a position monitor 36 operably coupled to the choke actuator 30 for monitoring the movement and/or position of the choke actuator 30 in real-time. The position monitor 36 may comprise an encoder, a magnetic sensor, a potentiometer, an optical sensor, a linear variable differential transformer, or a combination thereof, depending on the components of the choke actuator 30. In some embodiments, by tracking the movement and/or position of the choke actuator 30 in real-time, the corresponding position of the gate 22 relative to the choke seat 24 can also be determined in real-time.

The extent to which the choke valve 40 is open to fluid flow depends on the position of the gate 22 relative to the choke seat 24. The distance between the tip 38 and the choke seat 24 may be referred to as a "constriction". The size of the constriction dictates the flow area between the choke inlet 26 and the choke outlet 28. The smaller the constriction, the smaller the flow area and the higher the pressure drop from the choke inlet 26 to the choke outlet 28. Likewise, the larger the constriction, the larger the flow area and the lower the pressure drop between the choke inlet 26 to the choke outlet 28.

To change the position of the choke valve 40, the choke actuator 30 operates to move the gate 22 closer to or further away from the choke seat 24 to vary the size of the constriction. When the size of the constriction is about zero, the choke valve 40 is in a fully closed (FC) position wherein fluid flow through from inlet 26 to outlet 28 is substantially blocked. In some embodiments, a safety distance between the tip 38 and the choke valve 40 may be predetermined such that during operation of the choke, the tip 38 is be prevented from coming into contact with the choke seat 24, to prevent damage to the gate 22 and the choke seat 24. In some embodiments, the safety distance ranges from about 0.01% of the maximum size of the constriction to about 1% of the maximum size of the constriction. A skilled person can appreciate that the safety distance in other embodiments may be different from the above example, depending on the type of application and choke characteristics. When the constriction is greater than the safety distance, the choke valve 40 is in an open position where fluid is permitted to flow from the inlet 26 to the outlet 28, but the amount of fluid flow therethrough depends on the size of the constriction. When the constriction is at its maximum size, the choke valve is in a fully open (FO) position.

In some embodiments, one choke is used at a time to control fluid pressure in a system and/or the pressure drop across the choke valve. In other embodiments, two or more chokes may operate simultaneously to control fluid pressure in the system and/or the pressure drop across the respective choke valves. In some embodiments, a pressure management system, such as a choke manifold, comprises two or more chokes, which may be connected in parallel, for redundancy in case one choke fails and/or requires maintenance. The choke(s) in the choke manifold can be controlled by one or more choke controllers to obtain a desired fluid flow rate and/or pressure drop through each choke in order to maintain a desired pressure in the system. The chokes can be individually and selectively controlled. In some embodiments, one of the two or more chokes can be autonomously controlled by the controller while the other choke(s) is controlled manually (e.g. handwheel) or semi-manually (e.g. remotely via a controller) by an operator. In other embodiments, all the chokes are autonomously controlled by the one or more controllers. In some embodiments, one or more chokes are in operation while the other choke(s) is on standby in case the operating choke(s) fails.

Figure 2:
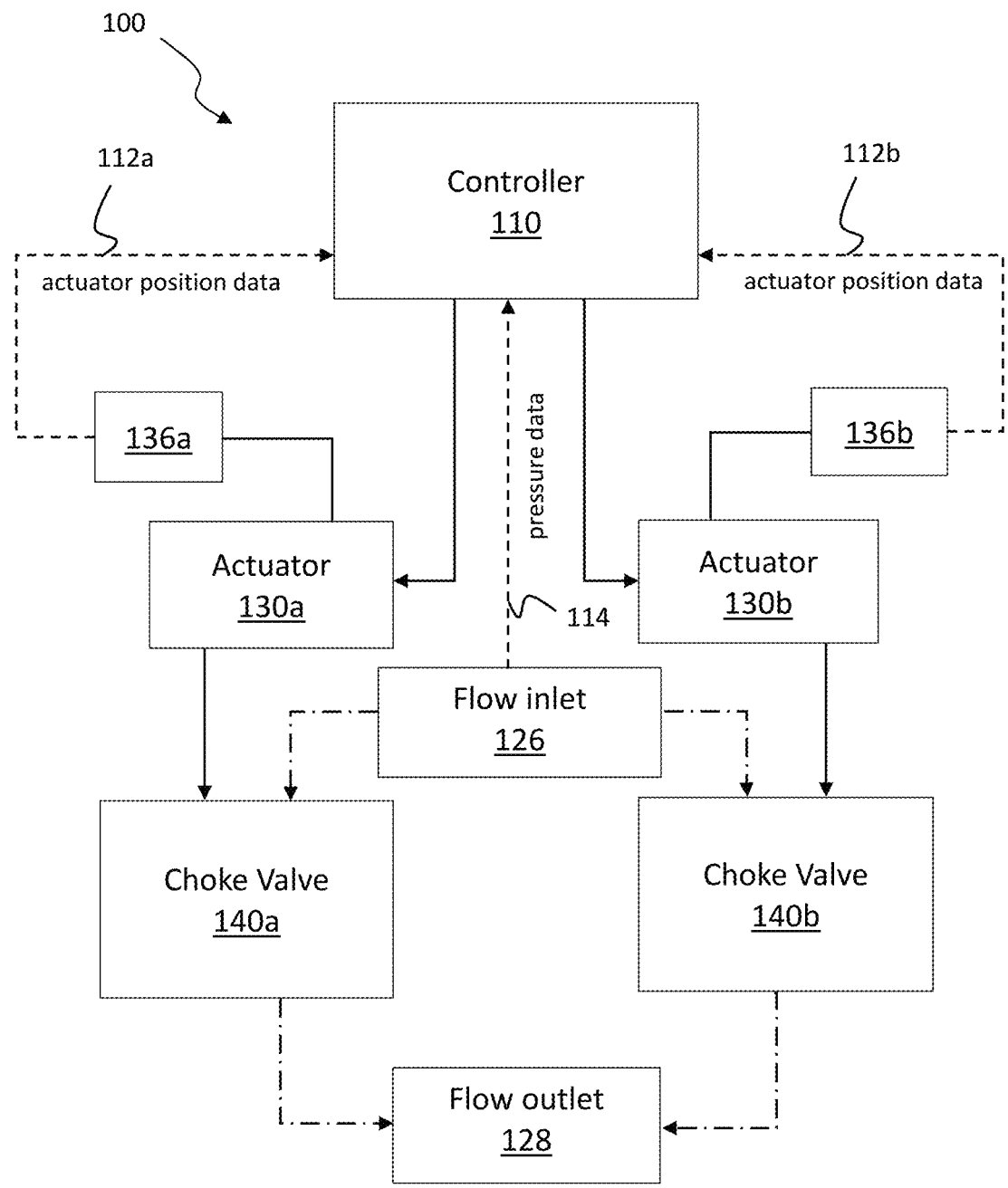
FIG. 2 is a block diagram of the choke system, according to one embodiment.

With reference to FIG. 2, in some embodiments, a choke system 100 comprises the choke controller 110, a first actuator 130a, a first choke valve 140a, a second actuator 130b, and a second choke valve 140b. The controller 110 is operably coupled to each of the first and second actuators 130a, 130b. The first and second actuators 130a, 130a are operably coupled to the first and second choke valves 140a, 140b, respectively. Each of the first and second actuators 130a, 130b is coupled to a respective position monitor 136a, 136b. In some embodiments, actuators 130a, 130b may each be the same as or similar to the above-described actuator 30 with respect to chokes 20 and 120 in FIGS. 1A and 1B. In some embodiments, choke valves 140a, 140b may each be the same as or similar to the above-described choke valve 40 with respective to chokes 20 and 120 in FIGS. 1A and 1B. In some embodiments, position monitors 136a, 136b may each be the same as or similar to the above-described position monitor 36 with respect to choke 120 in FIG. 1B. For simplicity, in the sample embodiments described herein, actuators 130a, 130b each have the same components as actuator 30 and choke valves 140a, 140b each have the same components as choke valve 40.

Controller 110 is configured to control and actuate actuators 130a, 130b. Upon command from the controller 110, the first and second actuators 130a, 130b operate to adjust the size of the constriction in the corresponding choke valves 140a, 140b, respectively, to control fluid flow therethrough. The position monitor 136a, 136b operably coupled to each of the actuators 130a, 130b monitors the movement and/or position of the respective actuator in real-time and provides actuator position data 112a, 112b regarding the movement and/or position of the respective actuator to the controller 110. The actuator position data 112a, 112b is used to determine the position of the gate 22 relative to the choke seat 24 (i.e., the size of the constriction) in each of the choke valves 140a, 140b, respectively.

In the illustrated embodiment, there are two choke valves 140a, 140b and two corresponding actuators 130a, 130b in system 100 but fewer or more chokes valves and/or actuators may be included in other embodiments. In some embodiments, each of the actuators 130a, 130b and their respective choke valves 140a, 140b can be individually and selectively controlled and actuated such that each choke actuator and its respective choke valve can operate independently of the other choke actuator and its respective choke valve. The first choke valve 140a and its respective actuator 130a may be collectively referred to as a "first choke". The second choke valve 140b and its respective actuator 130b may be collectively referred to as a "second choke".

In some embodiments, the choke inlets 26 of the choke valves 140a, 140b are in fluid communication with a common flow inlet 126, and the choke outlets 28 of the choke valves 140a, 140b are in fluid communication with a common flow outlet 128. In some embodiments, one or more pressure sensors are positioned in flow inlet 126 to measure the fluid pressure therein in real-time. In some embodiments, two pressure sensors are positioned in flow inlet 126 for redundancy in case one sensor malfunctions and/or for corroboration purposes. The inlet pressure data 114 collected by the pressure sensor(s) is sent to the controller 110.

Figure 3:
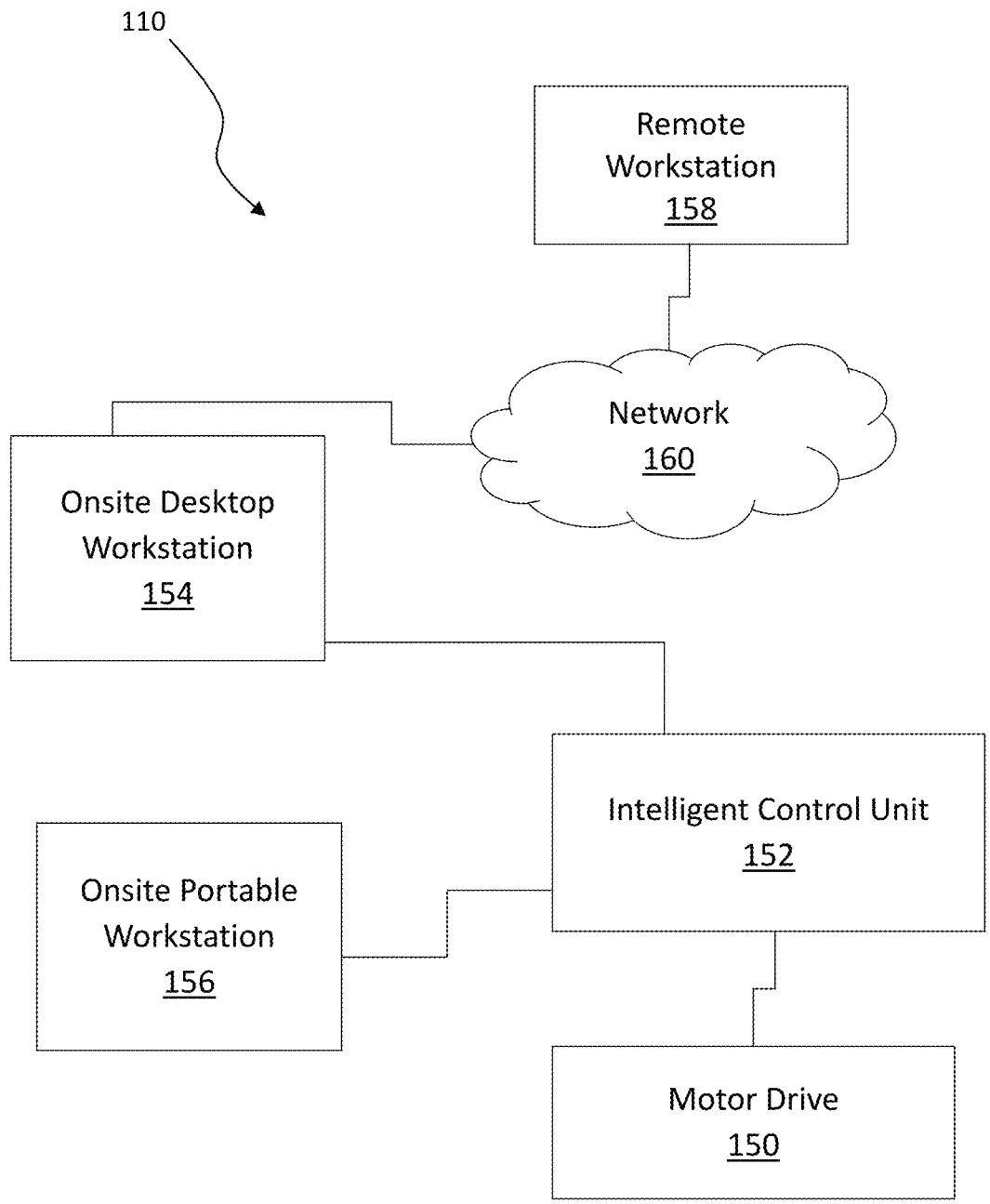
FIG. 3 is a block diagram of a controller usable in the choke system, according to one embodiment.

In some embodiments, with reference to FIG. 3, the controller 110 comprises a motor drive 150, an intelligent control unit (ICU) 152, and one or more of: an onsite desktop workstation 154, an onsite portable workstation 156, and a remote workstation 158. In some embodiments, the ICU 152 comprises a processor, a memory, and a PID controller. As a skilled person in the art can appreciate, the ICU 152 may comprise drives, networks, servers, breakers, switches, or other electrical or mechanical components to operate as described below. A sample embodiment of ICU 152 is described in detail below with respect to FIG. 9. In some embodiments, the motor drive 150 comprises a variable frequency drive (VFD). In some embodiments, each of the workstations 154, 156, 158 may comprise a processor, a memory, and/or a human-machine interface (HMI).

The motor drive 150 is communicatively coupled to the ICU 152 and the one or more workstations 154, 156, 158 are communicatively coupled to the ICU 152, by wired or wireless connectivity. In some embodiments, the remote workstation is communicatively coupled to the ICU via a network 160 and the onsite desktop workstation 154. The network 160 may include any useful computing network, including a cloud network, an intranet, the Internet, a local area network, a wide area network, a wireless data network, or any other such network or combination thereof. Communication over the network 160 may be enabled by wired or wireless connections or combinations thereof. In some embodiments, the remote workstation 158 may be communicatively coupled to the onsite desktop workstation 154 via the network 160 by wireless connectivity, such as wireless network components for signal transmission or other ways known to those skilled in the art. In some embodiments, the onsite portable workstation 156 may be communicatively coupled to the ICU 152 by wireless connectivity. In some embodiments, the onsite desktop workstation 154 may be communicatively coupled to the ICU 152 by wired or wireless connectivity. In some embodiments, the motor drive 150 is communicatively coupled to the ICU 152 via wired or wireless connectivity.

In some embodiments, the ICU 152 comprises at least one wireless transmitter for transmitting and receiving data signals to the onsite desktop workstation 154, the onsite portable workstation 156, and/or the motor drive 150. In some embodiments, the wireless transmitter may be located outside of the ICU 152 but communicatively coupled to the ICU 152 in a suitable matter. In some embodiments, the onsite portable workstation 156 is a wireless device that an operator can carry around an industrial worksite, such as a drilling rig, for remote communication with the ICU 152. In further embodiments, the ICU 152 may transmit and receive data signals by wired transmission as a backup.

In some embodiments, the remote workstation 158 is located some distance away from the industrial worksite, such as at a central command center that remotely monitors various aspects of the industrial worksite. In some embodiments, the remote workstation 158 is configured to allow a remote user to remotely control the one or more chokes in the choke system.

Various configurations of the controller 110 are possible. For example, the controller 110 may comprise: i) the onsite desktop workstation 154; ii) the onsite desktop workstation 154 and the remote workstation 158, which may be communicatively linked to the desktop workstation 154 via the cloud platform 160; iii) the onsite desktop workstation 154 and the one site portable workstation 156; iv) the onsite portable workstation 156; or v) all three workstations 154, 156, 158.

Any of the workstations 154, 156, 158 may comprise a processor-based device, such as a computing device that includes, but is not limited to: a desktop computer, laptop or notebook computer, tablet computer, mainframe computer system, handheld computer, network computer, or other computing devices with like capability.

With reference to FIGS. 2 and 3, the first and second actuators 130a, 130b can each be communicatively coupled to the motor drive 150 of the controller 100, via wired or wireless connectivity and via typical power and signal wiring, as known to those skilled in the art. In some embodiments, the position monitor 136a, 136b for each of the actuators 130a, 130b may be communicatively coupled to the ICU 152 and to the motor drive 150, via wired or wireless connectivity. In some embodiments, the one or more pressure sensors in the flow inlet 126 are communicatively coupled to the ICU 152 via wired or wireless connectivity.

In some embodiments, the ICU 152 is configured to receive and process the actuator position data 112a, 112b and inlet pressure data 114 and then generate command data and transmit the command data to the motor drive 150. In some embodiments, the motor drive 150 has internal control logic and is configured to process the command data and to control the movement of the actuator 130a, 130b to place the gate 22 in the desired position.

The relationship between the flow area in the choke valve 140a, 140b and the size of the constriction in the choke valve can be non-linear. The choke valve 140a, 140b can also behave non-linearly when there is an abrupt change in fluid flow rate, for example: when a pump that is in fluid communication with the choke valve is turned on or off, when there is an influx of fluid from the fluid source (e.g. the wellbore), when there is a loss of fluid in the system (e.g. a loss of fluid to the wellbore), when the flow area in the choke valve is clogged by debris in the fluid, etc. The conventional PID controller cannot effectively account for the aforementioned non-linearity of the choke 140a, 140b in real-time. To take into account the non-linear behavior of the choke 140a, 140b in real-time or as close to real-time as possible, the controller 110 of the present disclosure performs additional data analysis processes as described below.

Instead of using a constant value for the proportional gain coefficient P, the present technology uses an adaptive proportional gain coefficient which is determined by "adapting" the proportional gain coefficient P according to the real-time choke position, such that, in general, the proportional gain coefficient is larger when the choke valve is more open and smaller when the choke valve is less open. In some embodiments, the integral and derivative control coefficients can also be adapted with respect to the real-time choke position. In some embodiments, the controller 110 determines the adaptive proportional gain coefficient P(t) periodically based on the actuator position data 112a, 112b provided by the position monitor 136a, 136b of actuators 130a, 130b, respectively. In some embodiments, the position monitor 136a, 136b monitors the movement and/or position of the actuator 130a, 130b and, based on such movement and/or position of the actuator, the controller 110 can derive the position of the tip 38 relative to the choke seat 24 (i.e., the size of the constriction).

Figure 4:
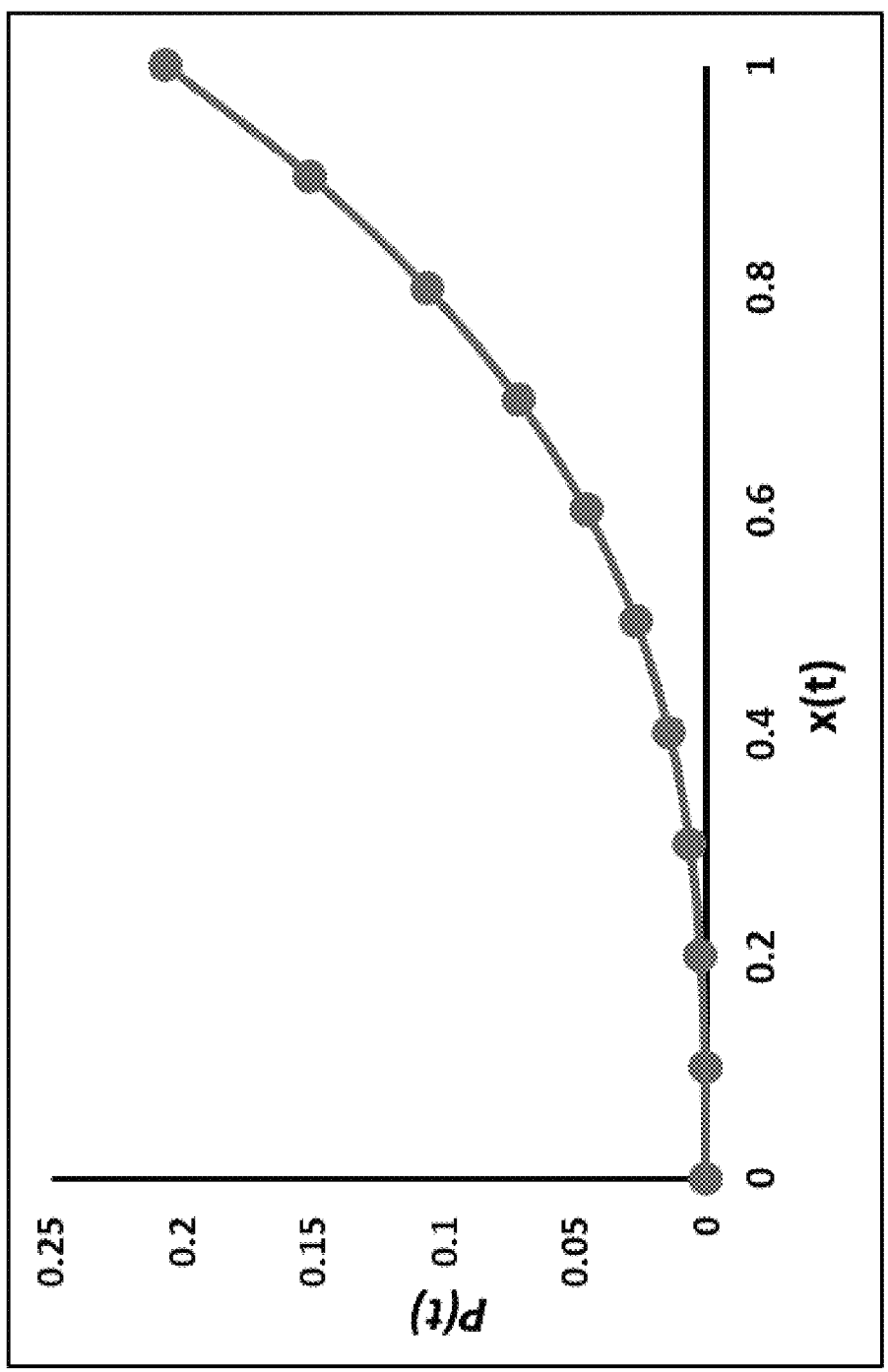
FIG. 4 is a graph illustrating the relationship between the adaptive proportional gain coefficient and the relative choke position, according to one embodiment.

In some embodiments, with reference to FIG. 4, the adaptive proportional gain coefficient P(t) is correlated with the relative position of the tip 38 inside the choke valve 140a, 140b using a power-law function. The relative position x of the tip 38 inside the choke valve (the "relative choke position") at a given time t (e.g. at the start of each time step) is defined as the ratio of the size of the constriction at time t and the size of the constriction when the choke valve 140a, 140b is in a fully open (FO) position. In some embodiments, the relative choke position x ranges between 0 and 1, with 0 corresponding to a fully closed (FC) position of the choke valve and 1 corresponding to a fully open (FO) position of the choke valve. In other embodiments, the relative choke position x may be expressed as a percentage, with 0% corresponding to the FC position and 100% corresponding to the FO position. In some embodiments, the choke valve 140a, 140b is considered to be in the NFC position when the relative choke position is less than an NFC threshold, for example, when x is about 0.01 (or 1%) or less. In some embodiments, the choke is considered to be in the NFO position when the relative choke position is greater than an NFO threshold, for example, when x is about 0.8 (or 80%) or greater. A skilled person in the art can appreciated that the NFC and NFO thresholds in other embodiments may be different from the above examples, depending on the specific application and choke characteristics.

The adaptive proportional gain coefficient P(t) at time t can be generally defined as:

$$P(t)=A[x(t)+C1]^B+C2 \qquad (3)$$

where x(t) is the relative choke position at time t, and A, B, C1, and C2 are constants that are determined and optimized through experimentation. In some embodiments, the values of constants A, B, C1, and C2 are dependent on choke characteristics (e.g. choke geometry, gate and seat geometry, etc.), the length of each time step, the speed of actuator 30, the acceleration of actuator 30, the desired pressure profile of fluid flow, and/or other operating conditions of the particular industrial operation. For example, the adaptive proportional gain coefficient P(t) can be optimized for fluctuating flowrates, flow containing large solid particles, or for maintaining a set pressure when fluid flow ramps up or ramps down rapidly. In drilling operations, flowrate fluctuations may occur while tripping the pipe out or into the well, and the rapid ramping up or down of fluid flow may occur while making a pipe connection wherein the rig pump is ramped up or down. The proportional gain coefficient P(t) corresponding to operational conditions can either be defined by varying the parameters in Equation (3) or be defined as a fixed value. This non-linearity, which is applied besides the correlation between proportional gain coefficient and choke position, can be applied by the operator or automatically based on sensor feedback providing the relevant information to the controller 100 about the operational conditions, so an appropriate proportional gain coefficient is registered in the controller 110. Examples of such sensors include flowmeters and pressure sensors. In some embodiments, the parameters in Equation (3) are selected to optimize choke performance in maintaining a desired pressure in the system with respect to the operational conditions, with sensors cascading information regarding the operational conditions to the controller in real-time.

Through experimentation, the inventors observed that the relationship between the measured fluid pressure in flow inlet 126 and the relative choke position of the operating choke valve (e.g. choke valve 140a) follows a power-law function. The inventors also found that, when the pressure at the flow inlet 126 is constant, the relative choke position varies according to a power-law relationship when the flowrate and flow viscosity of the fluid changes. As a result, the adaptive proportional gain coefficient P(t) can be spontaneously adjusted for different flowrates, viscosities, and inlet pressures with respect to the relative choke position x.

In a sample embodiment, constants A, B, C1, and C2 in Equation (3) are determined to be 0.2, 4, 0.01, and 0.001, respectively. In this embodiment, constants A, B, C1, and C2 are determined experimentally and tested for various flowrates in the range of about 1.2 L/min to about 400 L/min and for various pressures in the range of about 500 Pa to about 8500 kPa. FIG. 4 is a plot of the adaptive proportional gain coefficient P(t) versus the relative choke position x(t) according to Equation (3) using the values of constants A, B, C1, and C2 in the sample embodiment.

In some embodiments, only the proportional gain coefficient is adapted according to the real-time relative choke position, while the integral and derivative coefficients are set as constants. In other embodiments, one or both of the integral and derivative coefficients are adapted with respect to the real-time choke position. For example, once the adaptive proportional gain coefficient P(t) is determined using Equation (3), the adaptive integral coefficient I(t) and the adaptive derivative coefficient D(t) can be determined as follows:

$$I(t)=E \times P(t)/T \quad (4)$$

$$D(t)=F \times T \times P(t) \quad (5)$$

where T is the oscillation period defined by Ziegler-Nichols, which can be determined experimentally. Constants E and F are also determined and optimized experimentally to obtain the desired pressure profile. In some embodiments, the values of constants T, E, and F are dependent on choke characteristics (e.g. choke geometry, gate and seat geometry, etc.), the length of each time step, the speed of actuator 30, the acceleration of actuator 30, the desired pressure profile of fluid flow, and/or other operating conditions of the particular industrial operation.

Using Equation (1), the controller 110 of the present disclosure calculates at every time step the control variable u(t) using the adaptive proportional gain coefficient P(t), the adaptive integral coefficient I(t), and the adaptive derivative coefficient D(t) as determined by Equations (3) to (5) rather than the constants P, I, and D. As shown in FIG. 4, as the relative choke position x(t) approaches zero, the adaptive proportional gain coefficient P(t) is much smaller than that when the relative choke position x is closer to 1. As a result, the value of the control variable u(t) as determined by Equation (1), when the constants P, I, and D are substituted with P(t), I(t), and D(t), indicates that the gate 22 should move much slower toward the choke seat 24 as the choke valve approaches the fully closed position. In some embodiments, in using the adaptive proportional gain coefficient P(t) instead of the constant proportional gain coefficient P, overshooting of the pressure may be prevented regardless of changes in the viscosity and/or flowrate of the fluid passing through the choke valve.

The above-described adaptive coefficient process has its limits. Consider the sample scenario where a drilling operation is temporarily stopped, the mud pump is turned off, and the choke is in the fully closed position, and then the mud pump is subsequently turned back on to resume the drilling operation. Once the mud pump is turned on again, pressure starts to build up inside the drilling system, including the SBP. The SBP in the drilling system is monitored and since the SBP deviates from the desired SBP as the drilling operation resumes, the PID controller signals the choke actuator (e.g. actuator 130a) to move the gate 22 away from the choke seat 24 in order to open the corresponding choke valve (e.g. choke valve 140a) and allow drilling mud to flow through the choke. As the choke valve is initially in the FC or NFC position, the relative choke position x is zero or very close to zero, so the control variable u(t) as determined using the adaptive proportional gain coefficient P(t) results in a slow opening of the choke valve by the choke actuator. Opening the choke valve slowly as the mud pump resumes operation can cause a rapid buildup in pressure in the choke because the pressure in the choke is not released quickly enough.

To address the limitations of the adaptive coefficient process, the controller 110 is configured to implement an augmentation process in addition to the adaptive coefficient process. In some embodiments, based on the inlet pressure data provided to the controller 110, the controller 110 determines whether the operating choke valve is in a stable state. If it is determined that the choke valve is in an unstable state (for example, where there are rapid changes in the inlet pressure ("$P_C$")) and the inlet pressure $P_C$ deviates from the desired inlet pressure ("setpoint pressure") by a predetermined augmentation threshold ("$T_{AUG}$"), the controller 110 applies an augmentation algorithm and signals the corresponding choke actuator to augment the movement of the gate 22 to help prevent pressure spikes in flow inlet 126.

Figure 5:
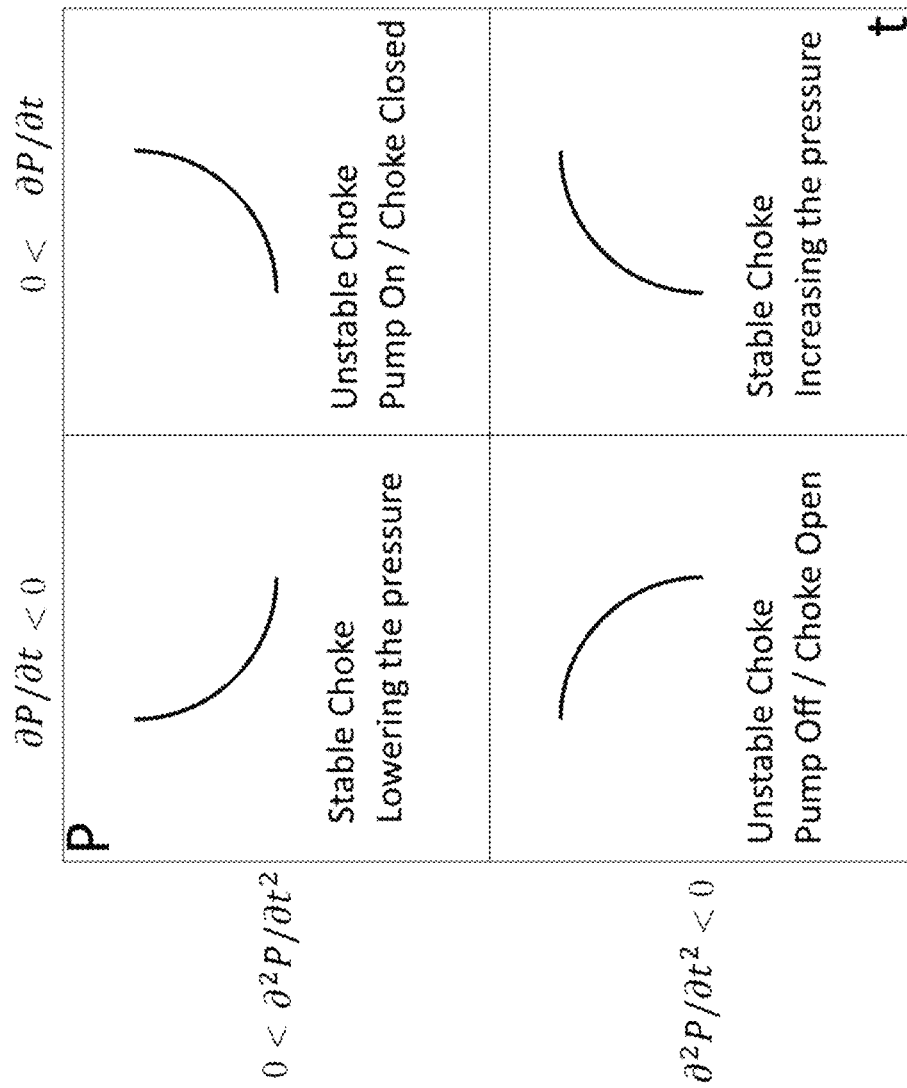
FIG. 5 is a diagram illustrating the relationship between the first and second time-derivatives of pressure and stability of the choke.

To determine whether a choke valve is in a stable or unstable state, the inlet pressure $P_C$ as measured in real-time by the one or more sensors in flow inlet 126 is continuously or periodically (e.g. at every time step) monitored by the controller 110. From the inlet pressure data 114, the controller 110 determines the first time-derivative ($\partial P/\partial t$) and second time-derivative ($\partial^2 P/\partial^2 t$) of the inlet pressure $P_C$. With reference to FIG. 5, when the first time-derivative ($\partial P/\partial t$) and second time-derivative ($\partial^2 P/\partial^2 t$) of the inlet pressure are both positive, it is an indication that the choke is in an unstable state. For example, the first time-derivative ($\partial P/\partial t$) and second time-derivative ($\partial^2 P/\partial^2 t$) of the inlet pressure may both be positive when the mud pump is on, but the choke valve is in the fully closed or NFC position. When the first time-derivative ($\partial P/\partial t$) and second time-derivative ($\partial^2 P/\partial^2 t$) of the inlet pressure are both negative, it is also an indication that the choke is in an unstable state. For example, the first time-derivative ($\partial P/\partial t$) and second time-derivative ($\partial^2 P/\partial^2 t$) of the inlet pressure may both be negative when the mud pump is off, but the choke valve is in an open or NFO position.

When the first time-derivative ($\partial P/\partial t$) is negative and the second time-derivative ($\partial^2 P/\partial^2 t$) is positive, it is an indication that the choke is in a stable state. For example, the first time-derivative ($\partial P/\partial t$) may be negative and the second time-derivative ($\partial^2 P/\partial^2 t$) may be positive when the choke valve is being opened to decrease the inlet pressure. When the first time-derivative ($\partial P/\partial t$) is positive and the second time-derivative ($\partial^2 P/\partial^2 t$) is negative, it is also an indication that the choke is in a stable state. For example, the first time-derivative ($\partial P/\partial t$) may be positive and the second time-derivative ($\partial^2 P/\partial^2 t$) may be negative when the choke valve is being closed to increase the inlet pressure.

In some embodiments, as part of the augmentation process, the controller 110 calculates an augmentation correction AUG(t), the value of which correlates to the relative choke position x(t) according to a power-law function as determined through experimentation. In some embodiments, the augmentation correction AUG(t) is:

$$AUG(t) = Y[(1-x(t))+C3]U+W\times|e(t)| \qquad (6)$$

where Y, C3, U, and W are constants that can be determined and optimized experimentally according to the desired pressure profile. In some embodiments, the values of constants Y, C3, U, and W are dependent on choke characteristics (e.g. choke geometry, gate and seat geometry, etc.), the length of each time step, the speed of actuator 30, the acceleration of actuator 30, the desired pressure profile of fluid flow, and/or other operating conditions of the particular industrial operation. In some embodiments, e(t) is the error, which is the difference between the setpoint pressure SP(t) and the current inlet pressure $P_C(t)$. In some embodiments, Y is 7000, C3 is 0.01, U is 10, and W is 0.

Figure 6:
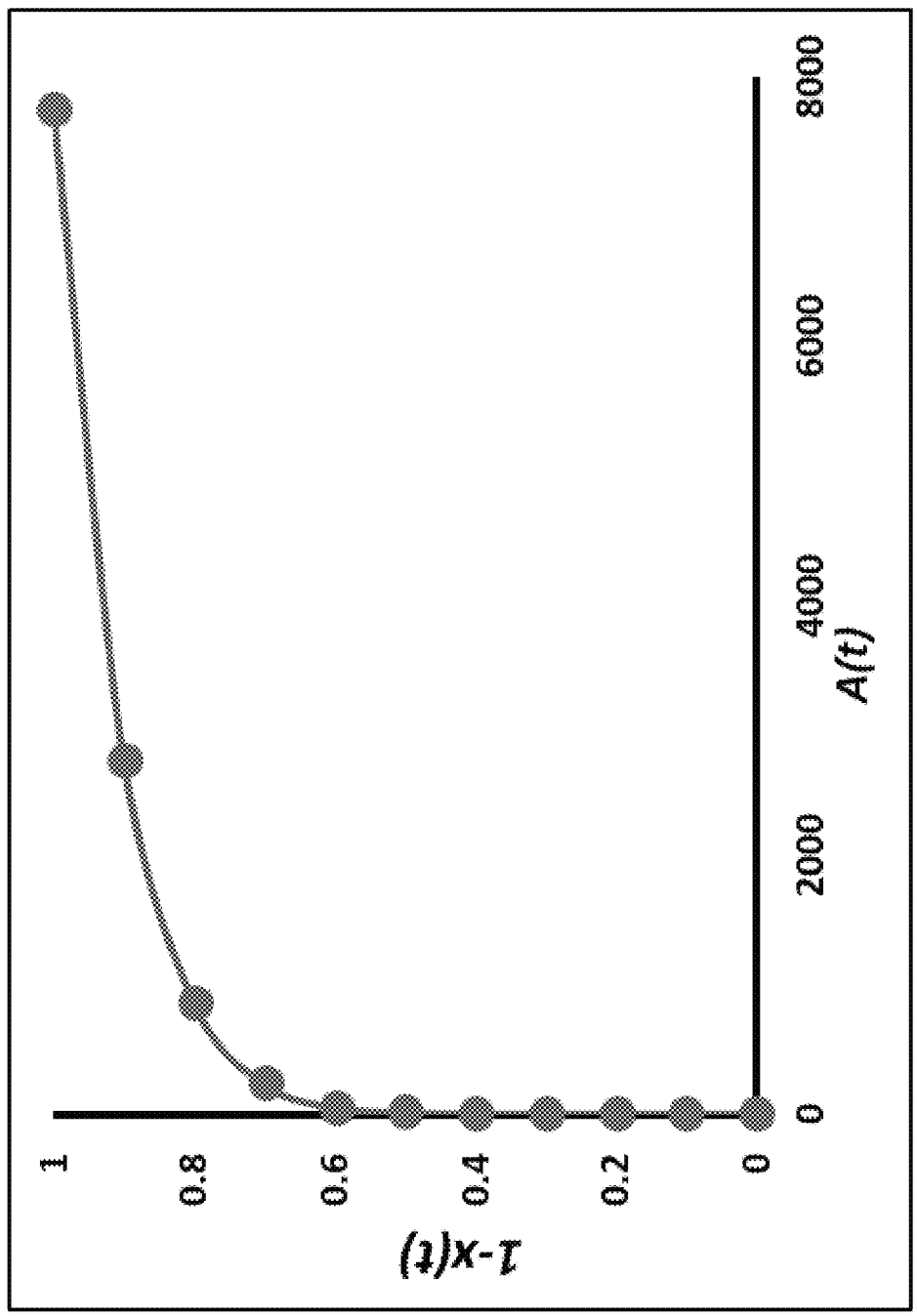
FIG. 6 is a graph illustrating the augmentation correction as a function of the relative choke position, according to one embodiment.

In some embodiments, the augmentation correction AUG (t) is defined as the number of length units (LU) of the choke actuator (e.g. electric motor) movement. In a sample embodiment, 512 LU correspond to one electric motor rotation which equals 0.002 variation in the relative choke position x of the choke valve. FIG. 6 is a sample graph illustrating the relationship between the augmentation correction AUG(t) and the relative choke position x(t) according to one embodiment. From FIG. 6, it can be seen that the augmentation correction AUG(t) is almost negligible when the choke valve is open (i.e., where the relative choke position x(t) is about 0.4 or greater) while the augmentation correction AUG(t) is much larger when the choke valve is in the NFC position (i.e., where x(t) is about 0.3 or less). Accordingly, when the choke valve is in a stable state, the effect of the augmentation algorithm is insignificant, so the movement of the choke actuator is mainly governed by the adaptive coefficient process. When the choke valve is in an unstable state, the effect of the augmentation algorithm on the movement of the actuator is much greater. For example, when the choke valve is an unstable state and in the NFC position, the controller 110 implements the augmentation algorithm and the resulting augmentation correction AUG(t) is large enough to result in the controller signaling the actuator to move the corresponding gate 22 faster, thereby mitigating against the effect of the low adaptive proportional gain coefficient P(t) on choke performance in the NFC position.

Figure 7A:
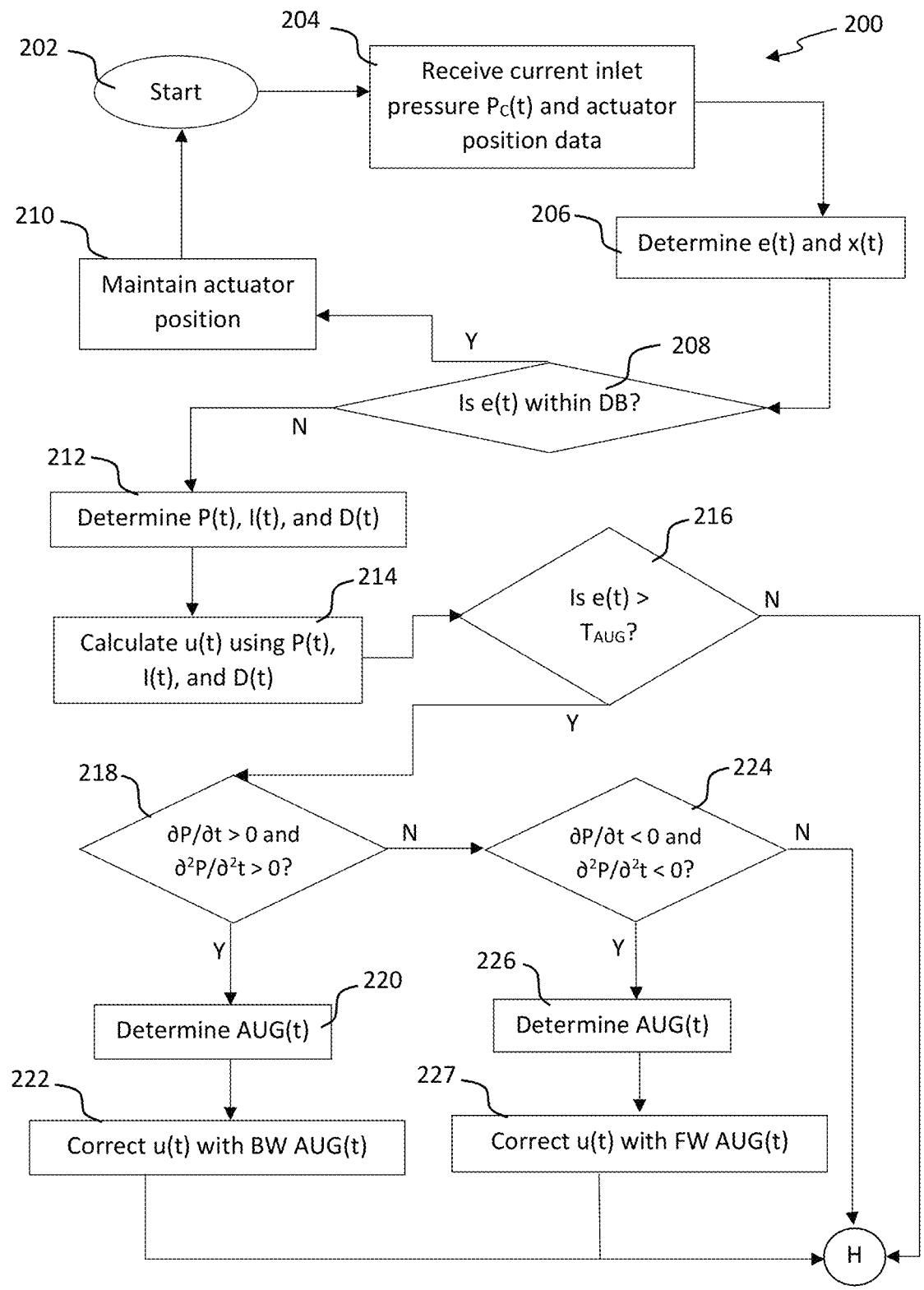
FIGS. 7A and 7B are flowcharts of a sample process that can be carried out by the controller in the choke system, according to one embodiment.
Figure 7B:
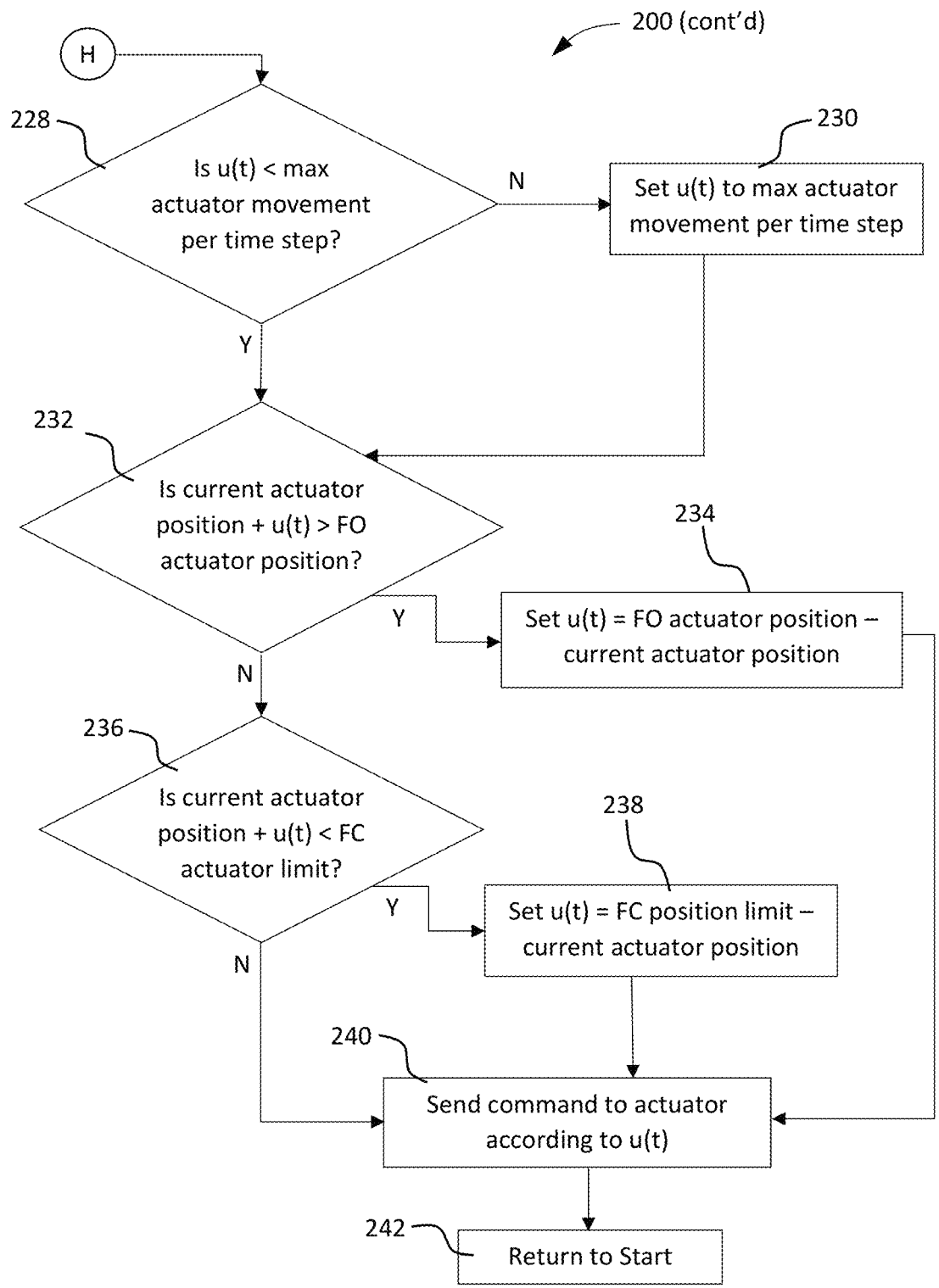

FIGS. 7A and 7B illustrate a sample process 200 that can be carried out by controller 110 in association with a choke valve (e.g. choke valve 140a) in each time step, according to some embodiments. Prior to starting process 200, choke valve 140a is calibrated to define the FC position and the FO position. In a sample embodiment, to calibrate the choke valve 140a, the torque of the motor in the choke actuator 130a is measured by a torque sensor and the motor torque is monitored, for example by the controller 110, to determine whether the choke valve 140a is in the FC position (i.e., the gate 22 is abutting the seat 24). To reach the FC position, the motor rotates in a first direction (e.g. clockwise) to move the gate 22 forward towards the seat 24. The motor torque is substantially constant as long as the gate 22 is moving. When the tip 38 of the gate 22 reaches the seat 24 and the gate can no longer move forward, the motor torque increases. In some embodiments, the controller monitors this increase in motor torque and records the corresponding actuator position (or the actuator position some time before the increase in motor torque) as the FC position. A number value may be associated with or assigned to the actuator position in the FC position (the "FC actuator position").

The FO position of the choke valve may be defined actively or passively. In some embodiments, to define the FO position actively, the motor rotates in a second direction (e.g. counter-clockwise) to drive the gate 22 backwards away from the choke seat 24 while the motor torque is monitored. When the gate 22 reaches the end of its stroke, as far as the gate 22 can move backwards, the gate 22 cannot move any further and as a result the motor torque increases. The controller checks for this increase in motor torque and records the corresponding actuator position (or the actuator position some time before the increase in motor torque) as the FO position. A number value may be associated with or assigned to the actuator position in the FO position (the "FO actuator position").

In some embodiments, the FO position can be defined passively. Based on the choke valve's configuration (e.g. size, geometry, and/or gearbox ratio), the amount of actuator movement that is required to move the gate 22 from the FC position to (or close to) the end of the gate's stroke can be determined. The FO actuator position, defined passively, is the FC actuator position plus the actuator movement required to move the gate 22 to the FO position.

While the above example is described with respect a choke actuator with a motor, it can be appreciated that the choke valve can be calibrated where the mechanism of the choke actuator does not comprise a motor.

In a sample embodiment, the FC actuator position has a value of 1000 and the FO actuator position has a value of 2000. The number values are associated with the actuator movement. In this example, it takes 1000 actuator movements to move the gate from the FC position to the FO position and vice versa.

The process 200 begins at the start of each time step t (step 202) and the controller 110 receives the current inlet pressure data and actuator position data (step 204). From the inlet pressure data and actuator position data, the controller determines the error e(t) using Equation (2) (i.e., comparing the setpoint pressure SP(t) with the inlet pressure $P_C(t)$ derived from the inlet pressure data) and the relative choke position x(t) (step 206). In some embodiments, the inlet pressure data may be filtered to remove noise prior to step 206. In some embodiments, the actuator position data may include the current position of the choke actuator 130a, which can be used to derive the current relative choke position x(t). In some embodiments, the position monitor 136a transmits the current actuator position to the controller 110 and the controller can determine the current relative choke position x(t) by comparing the current actuator position with previously defined the FC actuator position and the FO actuator position when the choke valve 140a is calibrated. Using the above example, if the actuator position in the FO position is 2000, the actuator position in the FC position is 1000, and the current actuator position is 1600, then the current relative choke position x(t) is 0.6 (with x being 0 in the FC position and 1 in the FO position).

At step 208, the controller compares the absolute value of error e(t) with a predetermined dead-band (DB) threshold. The DB threshold is predefined to ensure that if the error e(t) is small enough that almost no resulting actuator movement is necessary, the controller does not carry out the remainder of the process 200 in the present time step. If the error e(t) is within the DB threshold then the controller 110 does nothing and the current position of the choke actuator 130a and the gate 22 is maintained (step 210) and the controller repeats the process 200 at the start 202 of the next time step.

If the error e(t) is greater than the DB threshold (step 208), the controller determines, at step 212, the adaptive proportional gain coefficient P(t), and optionally the adaptive integral coefficient/(t) and the adaptive derivative coefficient D(t), according to Equations (3) to (5). At step 214, the controller calculates the control variable u(t) using the adaptive proportional gain coefficient P(t), the adaptive integral coefficient/(t), and the adaptive derivative coefficient D(t) determined in step 212, in accordance with Equation (1).

In some embodiments, the control variable u(t) is (or translates to) a change in actuator movement or a change in relative choke position. In some embodiments, the control variable u(t) can be a positive value or a negative value, where the positive value corresponds to actuator movement in the backward or counterclockwise direction and the negative value corresponding to actuator movement in the forward or clockwise direction. In some embodiments, on one hand, a positive control variable u(t) corresponds to an increase in relative choke position x, which indicates a backward movement of the gate away from choke seat. On the other hand, a negative control variable u(t) corresponds to a decrease in relative choke position x, which indicates a forward movement of the gate towards the choke seat.

From step 214, the controller proceeds to step 216 where the error e(t) is compared with the augmentation threshold $T_{AUG}$. The augmentation threshold $T_{AUG}$ is predefined to ensure that error e(t) is large enough to warrant the application of the augmentation algorithm. At step 216, if the controller determines that the error e(t) is not greater than the augmentation threshold $T_{AUG}$, the controller proceeds to step 228 (FIG. 7B) without carrying out the augmentation algorithm.

At step 216, if the controller determines that the error e(t) is greater than the augmentation threshold $T_{AUG}$, the controller calculates the first time-derivative ($\partial P/\partial t$) and the second time-derivative ($\partial^2 P/\partial^2 t$) of the inlet pressure $P_C(t)$ and checks if the first time-derivative ($\partial P/\partial t$) and the second time-derivative ($\partial^2 P/\partial^2 t$) are both positive (step 218). If the first time-derivative ($\partial P/\partial t$) and the second time-derivative ($\partial^2 P/\partial^2 t$) are both positive, which means it is necessary to apply the augmentation algorithm, then the controller calculates the augmentation correction AUG(t) using Equation (6) (step 220). In some embodiments, at step 220, the controller assigns a positive value to the augmentation correction AUG(t). A positive augmentation correction AUG(t) corresponds to actuator movement in the backward (or counter-clockwise) direction (i.e., an increase in relative choke position x), which indicates backward movement of the gate away from choke seat.

At step 222, the controller applies the positive augmentation correction AUG(t) to the control variable u(t) determined at step 214 to correct (i.e., augment) the control variable u(t) in the backward direction (i.e., promoting the opening of the choke valve 140a). After step 222, the controller proceeds to step 228 (FIG. 7B).

If the first time-derivative ($\partial P/\partial t$) and the second time-derivative ($\partial^2 P/\partial^2 t$) are not both positive, then the controller checks if the first time-derivative ($\partial P/\partial t$) and the second time-derivative ($\partial^2 P/\partial^2 t$) are both negative (step 224). If the first time-derivative ($\partial P/\partial t$) and the second time-derivative ($\partial^2 P/\partial^2 t$) are both negative, which means it is necessary to apply the augmentation algorithm, then the controller calculates the augmentation correction AUG(t) using Equation (6) (step 226). In some embodiments, at step 226, the controller assigns a negative value to the augmentation correction AUG(t). A negative augmentation correction AUG(t) corresponds to actuator movement in the forward (or clockwise) direction (i.e., a decrease in relative choke position x), which indicates forward movement of the gate towards choke seat.

At step 227, the controller applies the negative augmentation correction AUG(t) to the control variable u(t) determined at step 214 to correct the control variable u(t) in the forward direction (i.e., promoting the closing of the choke valve 140a). After step 227, the controller proceeds to step 228 (FIG. 7B).

If the first time-derivative ($\partial P/\partial t$) and the second time-derivative ($\partial^2 P/\partial^2 t$) are not both negative (step 224), then the controller proceeds to step 228 (FIG. 7B) without carrying out the augmentation algorithm.

In some embodiments, a maximum actuator movement per time step is predefined to restrict how much the gate 22 can move relative to the choke seat 24 within each time step to, for example, prevent large pressure changes in the choke in a short time span. At step 228, the controller checks whether the absolute value of the control variable u(t), whether augmented or not, is less than the maximum actuator movement allowed per time step. If the control variable u(t) is not less than the maximum actuator movement, then the controller sets the value of the control variable u(t) to be equal to the maximum actuator movement (step 230) and proceeds to step 232. For example, if there are 1000 actuator movements between the FC position and the FO position, the maximum actuator movement per time step may be set to 300. If the control variable u(t) is less than the maximum actuator movement, then the controller proceeds to step 232.

At step 232, the controller checks if a resulting actuator position is greater than the FO actuator position. The resulting actuator position is equal to the current actuator position plus the actuator movement that corresponds to the control variable u(t) as determined immediately prior to step 232. For example, if the control variable u(t) is (or translates to) 200 actuator movements in the first direction (e.g. forward or clockwise) and the current actuator position is 1600, then the resulting actuator position is 1400. In another example, if the control variable u(t) is (or translates to) 100 actuator movements in the second direction (e.g. backward or counter-clockwise) and the current actuator position is 1600, then the resulting actuator position is 1700. In some embodiments, on one hand, a positive control variable u(t) results in the resulting actuator position being greater than the current actuator position, thus indicating a backward movement of the gate away from the choke seat. On the other hand, a negative control variable u(t) results in the resulting actuator position being less than the current actuator position, thus indicating a forward movement of the gate toward the choke seat.

At step 232, if the resulting actuator position is greater than the FO actuator position, the controller modifies the control variable u(t) to be equal to the FO actuator position minus the current actuator position (step 234) and then, at step 240, sends a command to the actuator 130a to move the actuator 130a by an amount according to u(t) as determined in step 234.

If the resulting actuator position is not greater than the FO actuator position (step 232), then the controller at step 236 checks if the resulting actuator position is less than a FC position limit, which is the FC actuator position in some embodiments, or the FC actuator position plus the safety distance if the safety distance has been set in other embodiments. The safety distance may correspond to an amount of actuator movement. In a sample embodiment, the FC actuator position is 1000 and the safety distance is set to 100 actuator movements, so the FC position limit is 1100. At step 236, if the resulting actuator position is less than the FC position limit, the controller modifies the control variable u(t) to equal to the FC position limit minus the current actuator position (step 238) and then, at step 240, send a command to the actuator 130a to move the actuator 130a by an amount according to u(t) as determined in step 238. At step 236, if resulting actuator position is not less than the FC position limit, the controller sends a command to the actuator 130a to move the actuator 130a by an amount according to u(t) as at step 232 (step 240).

After the command is sent at step 240, the controller proceeds to step 242 to return to the start (step 202) and repeats the process 200 at the next time step. In some embodiments, all the time steps are substantially the same in length throughout a single industrial operation. In other embodiments, the time steps may be different in length during the industrial operation.

While steps 228 to 240 are described with respect to actuator movement, maximum actuator movement per time step, current actuator position, and FO and FC actuator positions, it can be appreciated that these steps can alternatively be carried out using change in relative choke position, maximum change in relative choke position per time step, current relative choke position, and FO and FC positions, respectively.

Although the process 200 is described above with respect to choke valve 140a and choke actuator 130a in system 100, it can be appreciated that process 200 can also be carried out for choke valve 140b and choke actuator 130b, independently and in some embodiments simultaneously.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flowchart may be omitted or skipped. Any number of counters, state variables, warning semaphores, or messages might be added to the logical flow for purposes of enhanced utility, accounting, performance, measurement, troubleshooting or for similar reasons.

While FIGS. 2 and 3 illustrate an example of a system 100 that may implement the techniques above, many other similar or different configurations and/or environments are possible. The example configurations discussed and illustrated above are merely representative and not limiting.

In some embodiments, with reference to FIGS. 2 and 3, the ICU 152 sends the command to the motor drive 150 and the motor drive 150 is configured to execute the command to cause the actuator 130a, 130b to move the gate 22 by the desired amount. In some embodiments, based on the received command, the motor drive 150 generates a control signal that is sent to the actuator to actuate the mechanism of the actuator. The control signal may be digital or analog depending on how the motor drive 150 is communicatively coupled to the actuator 130a, 130b.

In some embodiments, various operating parameters may be input by the operator at any of the workstations for the ICU 152 and/or motor drive 150 to follow during operation. The operating parameters may include, for example: actuator speed, actuator acceleration rate, actuator deceleration rate (as the actuator approaches a position specified in the control signal), time step length, feedback frequency (how often the controller receives data from the position monitor and pressure sensor), maximum actuator movement per time step, dead-band threshold, pressure data filter type, number of actuator movements (e.g. motor revolutions) between the FC position and FO position, safety distance, setpoint pressure, augmentation threshold, etc. Where two or more chokes are present in the choke system, the operator may, via any of the workstations, define which choke is active and which choke(s) is on standby. Where two or more flow inlet pressure sensors are present, the operator may, via any of the workstations, define which pressure sensor is active and which sensor(s) is on standby. Any or all of the operating parameters may be stored in the ICU's memory. In some embodiments, the setpoint pressure is automatically determined by the ICU 152 rather than manually by the operator. In some embodiments, the operator can set a desired actuator position and/or relative choke position using any of the workstations. In some embodiments, the operator can set the desired actuator position and/or relative choke position via a human-machine interface (HMI).

With reference to FIG. 3, one or more of the workstations 152, 154, 156 may have a human-machine interface (HMI), which can include any type of user interface, including, for example: a graphical user interface, a command line user interface, and/or a hardware user interface. In one embodiment, the onsite portable workstation 156 has an HMI.

Figure 8A:
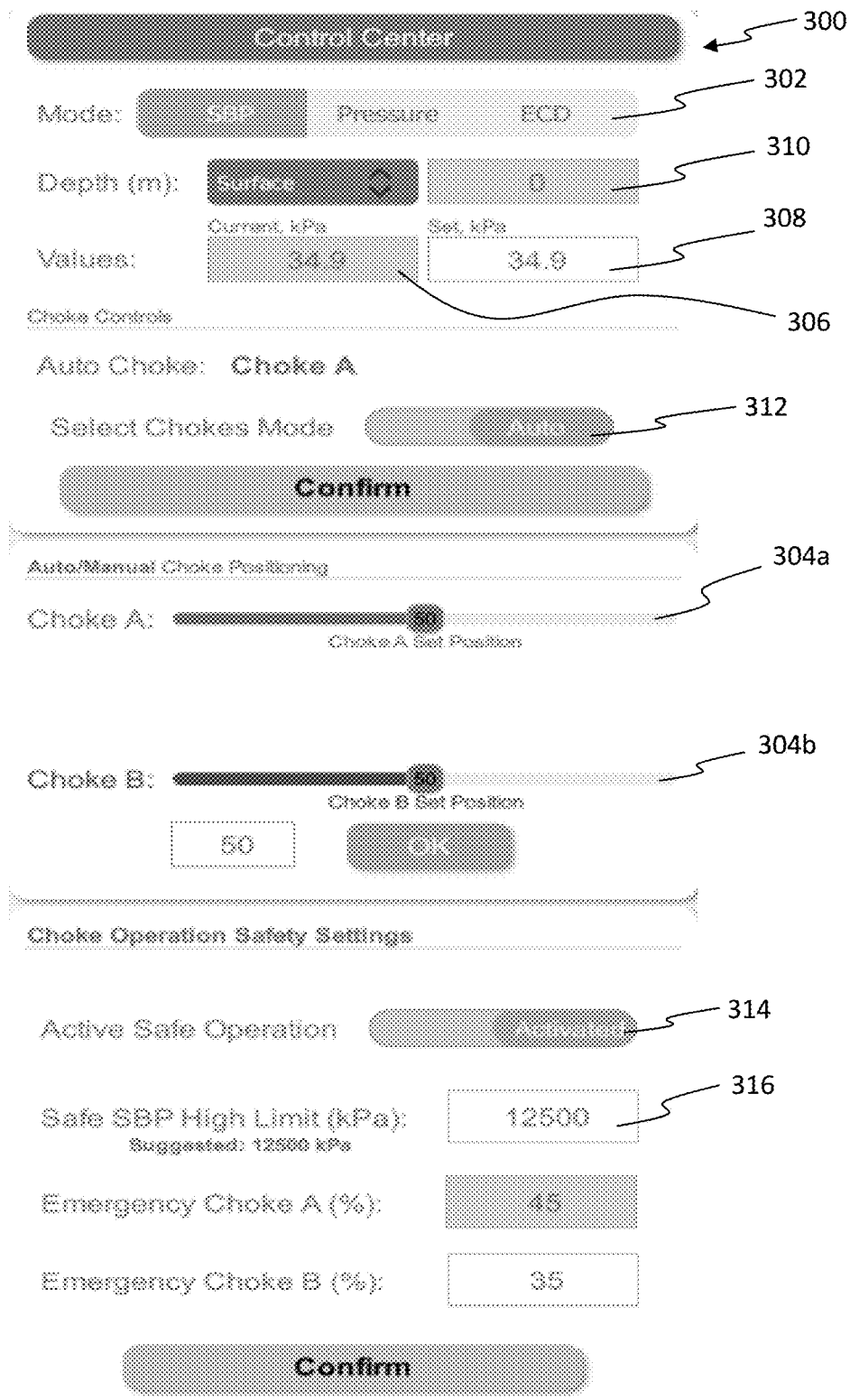
FIG. 8A is a diagram of a human-machine interface usable in the choke system, wherein automatic mode is selected, according to one embodiment.
Figure 8B:
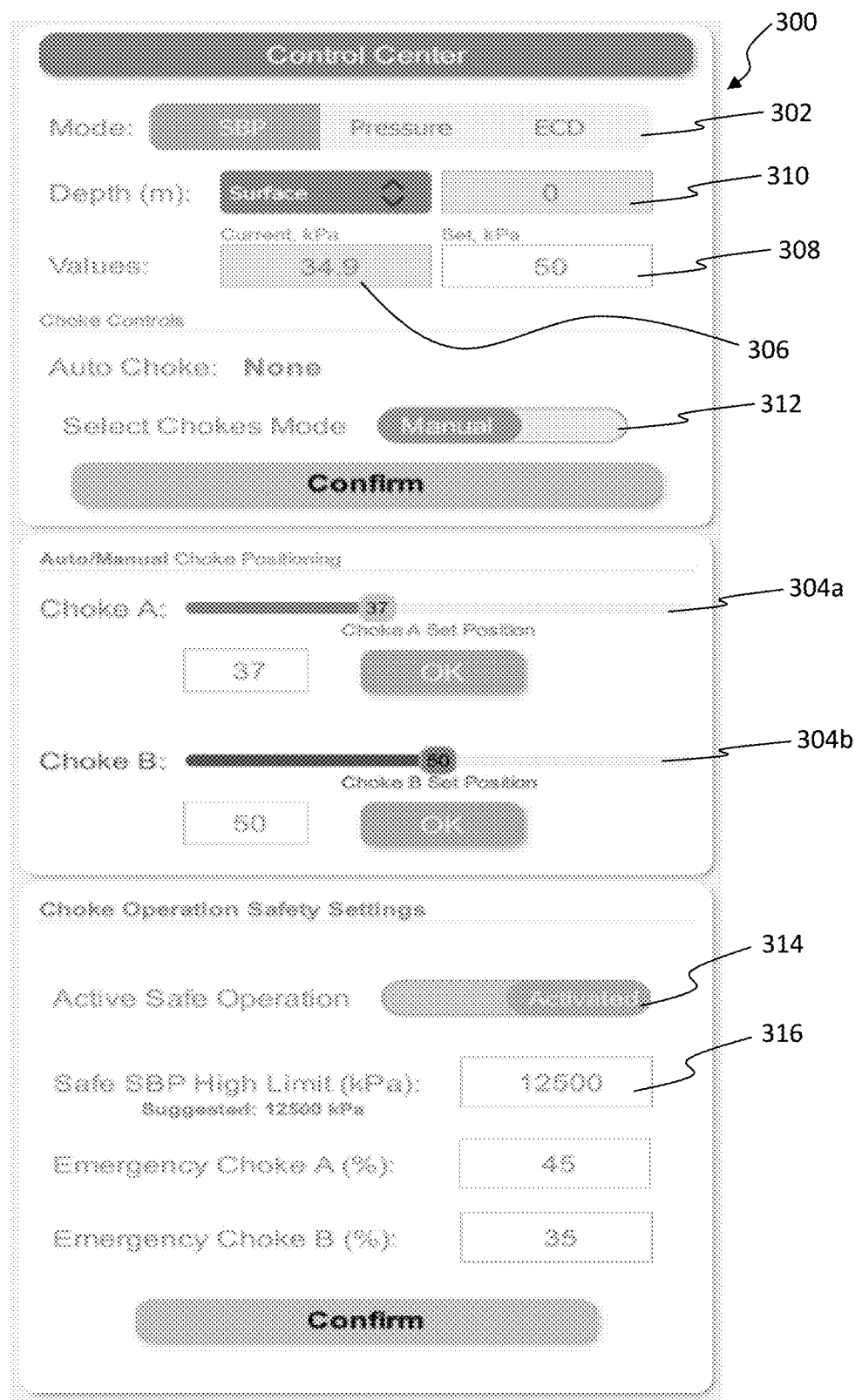
FIG. 8B is a diagram of a human-machine interface usable in the choke system, wherein manual mode is selected, according to one embodiment.

In some embodiments, the HMI is provided by the ICU 152 to a browser application over a network connection or the HMI is installed on the workstation (e.g. the portable workstation 156) that is in network communication with the ICU 152. The HMI may comprise interface controls (e.g., hardware interface buttons and/or software interface buttons) that are used to navigate control menus, functions, information, and user input for controlling one or more choke valves in the choke system. The HMI may include one or more displays configured to display the control menus, functions, and information that are navigated using the HMI. FIGS. 8A and 8B show a sample HMI 300.

In some embodiments, the HMI 300 allows the operator to view and monitor the position of one or more choke valves and at least one well control parameter from a workstation. In some embodiments, the operator can control operation of one or more choke valves via the HMI 300. In some embodiments, the HMI 300 facilitates control by the operator of the choke valves (e.g. 140a, 140b) via their corresponding actuators (e.g. 130a, 130b), wherein the controller is configured to control the choke actuators in response to user input through the HMI 300. In some embodiments, the HMI 300 comprises controls for controlling a position of one of the choke valves and can display choke valve information. Therefore, the HMI 300 can act as a control interface for the operator.

In the illustrated embodiment, HMI 300 comprises a mode selection panel 302 to allow the operator to select the type of data to control and/or view. For example, the types of data may include: SBP, pressure at a selected depth in the wellbore, and equivalent circulation density (ECD). In some embodiments, if the operator selects to control and/or view pressure at a selected depth, the operation can define the depth of interest in the input field 310 of the HMI 300. In some embodiments, the HMI 300 comprises a display 306 showing the current value of the type of data selected and an input field 308 allowing the operator to set the desired value of the type of data selected (e.g. the setpoint pressure).

In some embodiments, the HMI 300 comprises a toggle 312 that allows the operator to choose between two modes of controller operation: automatic and manual. FIG. 8A shows the HMI 300 where the automatic mode is selected and FIG. 8B shows the HMI 300 where the manual mode is selected. In some embodiments, the HMI 300 comprises one or more choke controls, each corresponding to a choke in the choke system. In the illustrated embodiment, the HMI 300 has two choke controls 304a, 304b corresponding to a first choke ("choke A") and a second choke ("choke B"), respectively.

With specific reference to FIG. 8A, where automatic mode is selected, the control (e.g. 304a) for at least one of the chokes (e.g. choke A) is locked so that the control cannot be adjusted by the operator, because the choke that corresponds to that specific control is autonomously controlled by the controller. In some embodiments, when automatic mode is selected, the controller autonomously controls the corresponding choke to maintain the desired pressure, without auxiliary equipment and/or intervention by the operator. In the illustrated embodiment shown in FIG. 8A, the controller 304a displays the current choke valve position of the corresponding choke (i.e., choke A). With reference to both FIGS. 8A and 8B, if the choke is not autonomously controlled by the controller, then the corresponding control (e.g. 304b in FIG. 8A and 304a, 304b in FIG. 8B) can be adjusted by the operator to change the position of the choke's valve, thereby allowing the operator to choose and set a desired position of the choke's valve. In some embodiments, the control allows the operator to choose a relative choke position, e.g. a percentage relative to the FC position and the FO position of the choke's valve. In some embodiments, the control comprises a sliding adjuster to allow the operator to set the desired choke valve position. In some embodiments, the control comprises an input field to allow the operator to enter the desired choke valve position.

For example, the operator may set a setpoint pressure in input field 308 that is different from the current pressure shown in display 306. When the setpoint pressure is entered, the current pressure and the setpoint pressure are sent to the controller and the controller automatically adjusts the choke position(s), according to the above-described method, to achieve the desired setpoint pressure entered by the operator.

In some embodiments, the HMI 300 includes a toggle 314 to allow the operator to selectively activate or deactivate a safety setting for the choke system. For example, the safety setting may allow the operator to set a maximum limit for the SBP (i.e., a limit under which the choke system can operate safely). In some embodiments, the HMI 300 comprises an input field 316 to allow the operator to set a safety limit for the SBP. When the safety setting is activated, the entered safety limit is sent to the controller and if the SBP exceeds the safety limit, the controller automatically adjusts the choke position(s) to help ensure safe operation of the choke system.

Input devices, including a touch screen, can be used to interact with any of the choke controls 304a, 304b and input fields in the HMI 300.

Figure 9:
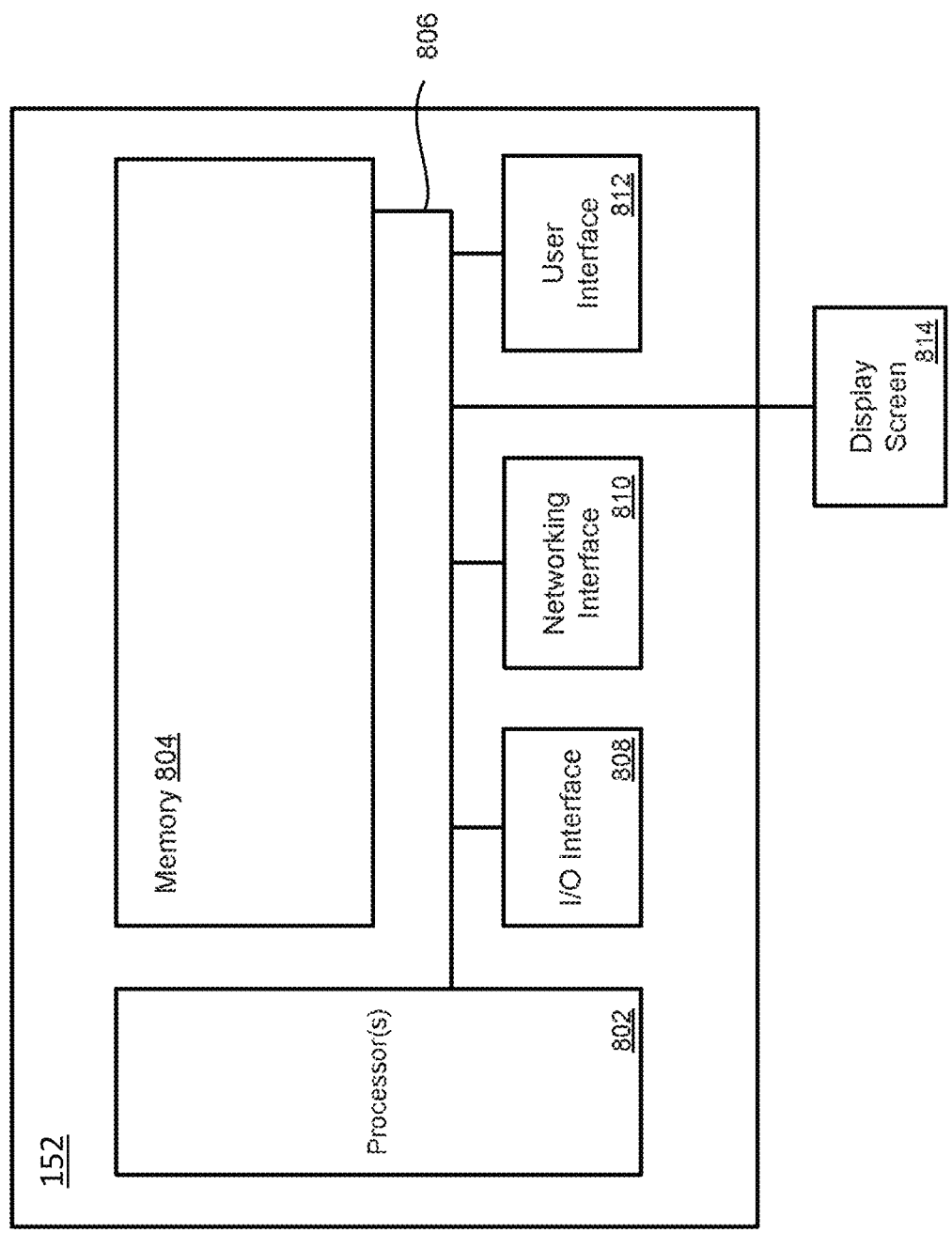
FIG. 9 is a block diagram of an intelligent control unit usable in the controller, according to one embodiment.

FIG. 9 illustrates a sample configuration of the ICU 152, according to some embodiments. The ICU 152 may include one or more processor(s) 802 that are in communication with memory device 804. The ICU 152 may include a local communication interface 806 for the components in the ICU 152. For example, the local communication interface 806 may be a local data bus and/or any related address or control busses as may be desired.

The memory device 804 may contain modules that are executable by the processor(s) 802 and data for the modules. For example, the memory device 804 may include a choke position control module, a PID controller module, an augmentation module, and/or other modules. The modules may execute the functions described earlier. For example, the memory device 804 may be random access memory (RAM), read only memory (ROM), flash memory, a solid state drive, memory card, a hard drive, optical disk, floppy disk, magnetic tape, or any other memory components. A data store may also be located in the memory device 804 for storing data related to the modules along with an operating system that is executable by the processor(s) 802. The term "data store" may refer to any device or combination of devices capable of storing, accessing, organizing and/or retrieving data. Storage system components of a data store may include storage systems such as a SAN (Storage Area Network), cloud storage network, volatile or non-volatile RAM, optical media, or hard-drive type media.

Other applications may also be stored in the memory device 804 and may be executable by the processor(s) 802. The term "executable" may mean a program file that is in a form that may be executed by a processor 802. Components or modules discussed in this description that may be implemented in the form of software using high programming level languages that are compiled, interpreted, or executed using a hybrid of methods. For example, a program in a higher level language may be compiled into machine code in a format that may be loaded into a random access portion of the memory device 804 and executed by the processor 802, or source code may be loaded by another executable program and interpreted to generate instructions in a random access portion of the memory device 804 to be executed by a processor 802. The executable program may be stored in any portion or component of the memory device 804.

The ICU 152 may also have an I/O (input/output) interface 808 used to communicate with I/O devices. One example of an I/O device is a display screen 814. The ICU 152 may include a networking interface 810 used receive and send network communications. The networking interface 810 may be a wired or wireless networking device that connects to the internet, a LAN, WAN, or other computing networks.

The processor 802 may represent multiple processors and the memory device 804 may represent multiple memory units that operate in parallel to the processing circuits. This may provide parallel processing channels for the processes and data in the system. The local interface 806 may be used as a network to facilitate communication between any of the multiple processors 802 and multiple memories 804. The local interface 806 may use additional systems designed for coordinating communication such as load balancing, bulk data transfer and similar systems.

Some of the operations described in this specification may be implemented by a hardware circuit comprising custom VLSI circuits or gate arrays, off-the-shelf semiconductors such as logic chips, transistors, or other discrete components. An operation may also be implemented by programmable hardware devices such as field programmable gate arrays, programmable array logic, programmable logic devices or the like.

Some operations may also be implemented by software for execution by various types of processors. The software may comprise one or more modules of executable code, which may, for instance, comprise one or more blocks of computer instructions, which may be organized as an object, procedure, or function. Nevertheless, the executables of module need not be physically located together but may comprise disparate instructions stored in different locations which comprise the operation and achieve the stated purpose for the module when joined logically together.

A module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

While the present technology is generally described with respect to oil and gas operations, it can be appreciated the above-described controller, system, and method can be used in any industrial application where fluid pressure management is desired.

Unless the context clearly requires otherwise, throughout the description and the "comprise", "comprising", and the like are to be construed in an inclusive sense, as opposed to an exclusive or exhaustive sense; that is to say, in the sense of "including, but not limited to"; "connected", "coupled", or any variant thereof, means any connection or coupling, either direct or indirect, between two or more elements; the coupling or connection between the elements can be physical, logical, or a combination thereof; "herein", "above", "below", and words of similar import, when used to describe this specification, shall refer to this specification as a whole, and not to any particular portions of this specification; "or", in reference to a list of two or more items, covers all of the following interpretations of the word: any of the items in the list, all of the items in the list, and any combination of the items in the list; the singular forms "a", "an", and "the" also include the meaning of any appropriate plural forms.

Where a component is referred to above, unless otherwise indicated, reference to that component should be interpreted as including as equivalents of that component any component which performs the function of the described component (i.e., that is functionally equivalent), including components which are not structurally equivalent to the disclosed structure which performs the function in the illustrated exemplary embodiments.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples but should be given the broadest interpretation consistent with the description as a whole.

What is claimed is:

1. A controller for controlling a choke actuator, the controller comprising:
    a processor;
    a memory device having instructions that, when executed by the processor, cause the controller to:
        receive, in real-time, position data for the choke actuator configured to control a choke valve that is positioned between an inlet and an outlet, the position data corresponding to a first position of the choke actuator;
        receive, in real-time, pressure data associated with a fluid pressure at the inlet;
        determine an adaptive proportional gain coefficient based on the position data;
        determine an error based on the pressure data and a predetermined setpoint pressure;
        determine a control variable based, at least in part, on the adaptive proportional gain coefficient and the error, the control variable corresponding to a movement of the choke actuator from the first position to a second position;
        generate a command signal based on the control variable;
        send the command signal to the choke actuator to cause the choke actuator to move as specified by the command signal;
        determine, prior to generating the command signal, whether the choke valve is in an unstable state based on the pressure data;

determine an augmentation correction where the error is greater than a predetermined augmentation threshold and the choke is in the unstable state; and correct the control variable with the augmentation correction;

wherein, to determine whether the choke valve is in the unstable state, the instructions cause the controller to:

determine a first time-derivative of pressure and a second time-derivative of pressure based on the pressure data; and determine that the choke valve is in the unstable state if the first time-derivative of pressure and the second time-derivative pressure are both negative or both positive.

2. The controller of claim 1, wherein the instructions further cause the controller to:

determine, prior to generating the command signal, whether the second position is in between a fully open position and a fully closed position of the choke actuator; and correct the control variable if the second position is not between the fully open position and the fully closed position.

3. The controller of claim 1, wherein determining the control variable comprises determining the control variable at a time t (u(t)) according to:

$$u(t) = Pe(t) + I \int_0^\tau e(\tau)dt + D\frac{de(t)}{dt}$$

where P is the adaptive proportional gain coefficient, e(t) is the error at time t, I is an integral coefficient, and D is an derivative coefficient.

4. The controller of claim 3, wherein the adaptive proportional gain coefficient is:

$$P = A[x(t) + C1]^B + C2$$

where x(t) is a relative choke position of the choke valve derived from the position data received at time t, and A, B, C1, and C2 are constants.

5. The controller of claim 4, wherein the instructions further cause the controller to:

receive data regarding operational conditions; and
determine one or more of A, B, C1, and C2 based, at least in part, on the data regarding operational conditions.

6. The controller of claim 4, wherein the integral coefficient is an adaptive integral coefficient, and the adaptive integral coefficient is:

$$I = E \times P / T$$

where T is an oscillation period defined by Ziegler-Nichols and E is an experimentally determined constant.

7. The controller of claim 4, wherein the derivative coefficient is an adaptive derivative coefficient, and the adaptive derivative coefficient is:

$$D = F \times T \times P$$

where T is an oscillation period defined by Ziegler-Nichols and F is an experimentally determined constant.

8. The controller of claim 1, wherein the augmentation correction at a time t(AUG(t)) is:

$$AUG(t) = Y[(1-x(t)) + C3]^U + W \times |e(t)|$$

where x(t) is a relative choke position derived from the position data received at time t, e(t) is the error at time t, and Y, C3, U, and W are experimentally determined constants.

9. The controller of claim 1, wherein to correct the control variable with the augmentation correction, the instructions cause the controller to:

correct the control variable in a backward direction if the first time-derivative of pressure and the second time-derivative of pressure are both positive; or correct the control variable in a forward direction if the first time-derivative of pressure and the second time-derivative of pressure are both negative.

10. The controller of claim 1, wherein the instructions further cause the controller to:

determine, prior to generating the command signal, whether the movement of the choke actuator from the first position to the second position is less than a predetermined maximum actuator movement; and correct the control variable if the movement of the choke actuator from the first position to the second position is not less than the predetermined maximum actuator movement.

11. The controller of claim 1, wherein the controller comprises one or more of: a remote workstation; an onsite desktop workstation; and an onsite portable workstation, for receiving operator input.

12. The controller of claim 11, wherein one or more of the remote workstation, the onsite desktop workstation and the onsite portable workstation comprises a human-machine interface having a display showing choke information and one or more choke controls that are adjustable by an operator.

13. The controller of claim 1, wherein the controller is configured to operate autonomously.

14. A computer-implemented method for controlling a choke actuator, the method comprising:

monitoring a first position of the choke actuator operable to variably control a choke valve that is positioned between an inlet and an outlet;

monitoring a fluid pressure at the inlet;

determining an adaptive proportional gain coefficient based on the first position;

determining an error by comparing the fluid pressure with a predetermined setpoint pressure;

determining a control variable based, at least in part, on the adaptive proportional gain coefficient and the error, the control variable corresponding to a movement of the choke actuator from the first position to a second position;

generating a command signal based on the control variable;

sending the command signal to the choke actuator to cause the choke actuator to move as specified by the command signal;

determining, prior to generating the command signal, whether the choke valve is in an unstable state based on the fluid pressure;

determining an augmentation correction where the error is greater than a predetermined augmentation threshold and the choke is in the unstable state; and correcting the control variable with the augmentation correction;

wherein determining whether the choke valve is in the unstable state comprises:

determining a first time-derivative of the fluid pressure and a second time-derivative of the fluid pressure; and determining that the choke valve is in the unstable state if the first time-derivative and the second time-derivative are both negative or both positive.

15. The method of claim 14 comprising:

determining, prior to generating the command signal, whether the second position is in between a fully open position and a fully closed position of the choke actuator; and correcting the control variable if the second position is not between the fully open position and the fully closed position.

16. The method of claim 14, wherein determining the control variable comprises determining the control variable at a time t (u(t)) according to:

$$u(t) = Pe(t) + I \int_0^\tau e(\tau)dt + D\frac{de(t)}{dt}$$

where P is the adaptive proportional gain coefficient, e(t) is the error at time t, I is an integral coefficient, and D is an derivative coefficient.

17. The method of claim 16, wherein the adaptive proportional gain coefficient is:

$$P = A[x(t)+C1]^B + C2$$

where x(t) is a relative choke position of the choke valve derived from the first position at time t, and A, B, C1, and C2 are constants.

18. The method of claim 17 comprising monitoring sensor data regarding operational conditions and determining one or more of A, B, C1, and C2 based, at least in part, on the sensor data regarding operational conditions.

19. The method of claim 17, wherein the integral coefficient is an adaptive integral coefficient, and the adaptive integral coefficient is:

$$I = E \times P/T$$

where T is an oscillation period defined by Ziegler-Nichols and E is an experimentally determined constant.

20. The method of claim 17, wherein the derivative coefficient is an adaptive derivative coefficient, and the adaptive derivative coefficient is:

$$D = F \times T \times P$$

where T is an oscillation period defined by Ziegler-Nichols and F is an experimentally determined constant.

21. The method of claim 14, wherein the augmentation correction at a time t(AUG(t)) is:

$$AUG(t) = Y[(1-x(t))+C3]^U + W \times |e(t)|$$

where x(t) is a relative choke position derived from the first position at time t, e(t) is the error at time t, and Y, C3, U, and W are experimentally determined constants.

22. The method of claim 14, wherein correcting the control variable with the augmentation correction comprises:

correcting the control variable in a backward direction if the first time-derivative and the second time-derivative are both positive; or correcting the control variable in a forward direction if the first time-derivative and the second time-derivative are both negative.

23. The method of claim 14, comprising:

determining, prior to generating the command signal, whether the movement of the choke actuator from the first position to the second position is less than a predetermined maximum actuator movement; and correcting the control variable if the movement of the choke actuator from the first position to the second position is not less than the predetermined maximum actuator movement.

24. The method of claim 14, comprising displaying, via a human-machine interface, the first position of the choke actuator.

25. The method of claim 14, comprising receiving operator input for one or more operating parameters from one or more of: a remote workstation; an onsite desktop workstation; and an onsite portable workstation.

26. The method of claim 14, wherein the method is performed periodically.

27. The method of claim 14, wherein the method is performed autonomously by a controller.

* * * * *